United States Patent
Chun et al.

(10) Patent No.: US 9,396,109 B2
(45) Date of Patent: Jul. 19, 2016

(54) METHOD AND APPARATUS FOR DRAM SPATIAL COALESCING WITHIN A SINGLE CHANNEL

(71) Applicant: QUALCOMM Incorporated, San Diego, CA (US)

(72) Inventors: Dexter Tamio Chun, San Diego, CA (US); Haw-Jing Lo, San Diego, CA (US); Michael Drop, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 199 days.

(21) Appl. No.: 14/142,573

(22) Filed: Dec. 27, 2013

(65) Prior Publication Data
US 2015/0186267 A1   Jul. 2, 2015

(51) Int. Cl.
*G06F 12/06* (2006.01)
*G06F 1/32* (2006.01)
*G06F 13/16* (2006.01)

(52) U.S. Cl.
CPC .............. *G06F 12/06* (2013.01); *G06F 1/3225* (2013.01); *G06F 1/3275* (2013.01); *G06F 13/1673* (2013.01); *Y02B 60/1225* (2013.01); *Y02B 60/1228* (2013.01)

(58) Field of Classification Search
CPC ................................... G06F 12/06; G06F 1/32
See application file for complete search history.

(56) References Cited

U.S. PATENT DOCUMENTS

| | | | |
|---|---|---|---|
| 6,145,065 A | 11/2000 | Takahashi et al. |
| 7,721,011 B1 | 5/2010 | Sutera |
| 7,773,676 B2 | 8/2010 | Chung et al. |
| 8,108,596 B2 | 1/2012 | Aldworth et al. |
| 8,135,936 B2 | 3/2012 | Schaefer et al. |
| 2006/0212726 A1 | 9/2006 | Wang et al. |
| 2011/0205824 A1 | 8/2011 | Kajigaya |

OTHER PUBLICATIONS

International Search Report and Written Opinion—PCT/US2014/070123—ISA/EPO—Mar. 30, 2015.

*Primary Examiner* — Yong Choe
(74) *Attorney, Agent, or Firm* — The Marbury Law Group, PLLC

(57) ABSTRACT

Aspects include computing devices, systems, and methods for reorganizing the storage of data in memory to energize less than all of the memory devices of a memory module for read or write transactions. The memory devices may be connected to individual select lines such that a re-order logic may determine the memory devices to energize for a transaction according to a re-ordered memory map. The re-order logic may re-order memory addresses such that memory address provided by a processor for a transaction are converted to the re-ordered memory address according to the re-ordered memory map without the processor having to change its memory address scheme. The re-ordered memory map may provide for reduced energy consumption by the memory devices, or a balance of energy consumption and performance speed for latency tolerant processes.

24 Claims, 12 Drawing Sheets

500

| Memory Device 7 | Memory Device 6 | Memory Device 5 | Memory Device 4 | Memory Device 3 | Memory Device 2 | Memory Device 1 | Memory Device 0 |
|---|---|---|---|---|---|---|---|
| 64n + 63 | 64n + 55 | 64n + 47 | 64n + 39 | 64n + 31 | 64n + 23 | 64n + 15 | 64n + 7 |
| 64n + 62 | 64n + 54 | 64n + 46 | 64n + 38 | 64n + 30 | 64n + 22 | 64n + 14 | 64n + 6 |
| 64n + 61 | 64n + 53 | 64n + 45 | 64n + 37 | 64n + 29 | 64n + 21 | 64n + 13 | 64n + 5 |
| 64n + 60 | 64n + 52 | 64n + 44 | 64n + 36 | 64n + 28 | 64n + 20 | 64n + 12 | 64n + 4 |
| 64n + 59 | 64n + 51 | 64n + 43 | 64n + 35 | 64n + 27 | 64n + 19 | 64n + 11 | 64n + 3 |
| 64n + 58 | 64n + 50 | 64n + 42 | 64n + 34 | 64n + 26 | 64n + 18 | 64n + 10 | 64n + 2 |
| 64n + 57 | 64n + 49 | 64n + 41 | 64n + 33 | 64n + 25 | 64n + 17 | 64n + 9 | 64n + 1 |
| 64n + 56 | 64n + 48 | 64n + 40 | 64n + 32 | 64n + 24 | 64n + 16 | 64n + 8 | 64n + 0 |

•

•

•

| 127 | 119 | 111 | 103 | 95 | 87 | 79 | 71 |
|---|---|---|---|---|---|---|---|
| 126 | 118 | 110 | 102 | 94 | 86 | 78 | 70 |
| 125 | 117 | 109 | 101 | 93 | 85 | 77 | 69 |
| 124 | 116 | 108 | 100 | 92 | 84 | 76 | 68 |
| 123 | 115 | 107 | 99 | 91 | 83 | 75 | 67 |
| 122 | 114 | 106 | 98 | 90 | 82 | 74 | 66 |
| 121 | 113 | 105 | 97 | 89 | 81 | 73 | 65 |
| 120 | 112 | 104 | 96 | 88 | 80 | 72 | 64 |
| 63 | 55 | 47 | 39 | 31 | 23 | 15 | 7 |
| 62 | 54 | 46 | 38 | 30 | 22 | 14 | 6 |
| 61 | 53 | 45 | 37 | 29 | 21 | 13 | 5 |
| 60 | 52 | 44 | 36 | 28 | 20 | 12 | 4 |
| 59 | 51 | 43 | 35 | 27 | 19 | 11 | 3 |
| 58 | 50 | 42 | 34 | 26 | 18 | 10 | 2 |
| 57 | 49 | 41 | 33 | 25 | 17 | 9 | 1 |
| 56 | 48 | 40 | 32 | 24 | 16 | 8 | 0 |

| Memory Device 7 | Memory Device 6 | Memory Device 5 | Memory Device 4 | Memory Device 3 | Memory Device 2 | Memory Device 1 | Memory Device 0 |
|---|---|---|---|---|---|---|---|
| 64n + 63 | 64n + 62 | 64n + 61 | 64n + 60 | 64n + 31 | 64n + 30 | 64n + 29 | 64n + 28 |
| 64n + 59 | 64n + 58 | 64n + 57 | 64n + 56 | 64n + 27 | 64n + 26 | 64n + 25 | 64n + 24 |
| 64n + 55 | 64n + 54 | 64n + 53 | 64n + 52 | 64n + 23 | 64n + 22 | 64n + 21 | 64n + 20 |
| 64n + 51 | 64n + 50 | 64n + 49 | 64n + 48 | 64n + 19 | 64n + 18 | 64n + 17 | 64n + 16 |
| 64n + 47 | 64n + 46 | 64n + 45 | 64n + 44 | 64n + 15 | 64n + 14 | 64n + 13 | 64n + 12 |
| 64n + 43 | 64n + 42 | 64n + 41 | 64n + 40 | 64n + 11 | 64n + 10 | 64n + 9 | 64n + 8 |
| 64n + 39 | 64n + 38 | 64n + 37 | 64n + 36 | 64n + 7 | 64n + 6 | 64n + 5 | 64n + 4 |
| 64n + 35 | 64n + 34 | 64n + 33 | 64n + 32 | 64n + 3 | 64n + 2 | 64n + 1 | 64n + 0 |

•

•

•

| | | | | | | | |
|---|---|---|---|---|---|---|---|
| 127 | 126 | 125 | 124 | 95 | 94 | 93 | 92 |
| 123 | 122 | 121 | 120 | 91 | 90 | 89 | 88 |
| 119 | 118 | 117 | 116 | 87 | 86 | 85 | 84 |
| 115 | 114 | 113 | 112 | 83 | 82 | 81 | 80 |
| 111 | 110 | 109 | 108 | 79 | 78 | 77 | 76 |
| 107 | 106 | 105 | 104 | 75 | 74 | 73 | 72 |
| 103 | 102 | 101 | 100 | 71 | 70 | 69 | 68 |
| 99 | 98 | 97 | 96 | 67 | 66 | 65 | 64 |
| 63 | 62 | 61 | 60 | 31 | 30 | 29 | 28 |
| 59 | 58 | 57 | 56 | 27 | 26 | 25 | 24 |
| 55 | 54 | 53 | 52 | 23 | 22 | 21 | 20 |
| 51 | 50 | 49 | 48 | 19 | 18 | 17 | 16 |
| 47 | 46 | 45 | 44 | 15 | 14 | 13 | 12 |
| 43 | 42 | 41 | 40 | 11 | 10 | 9 | 8 |
| 39 | 38 | 37 | 36 | 7 | 6 | 5 | 4 |
| 35 | 34 | 33 | 32 | 3 | 2 | 1 | 0 |

FIG. 6

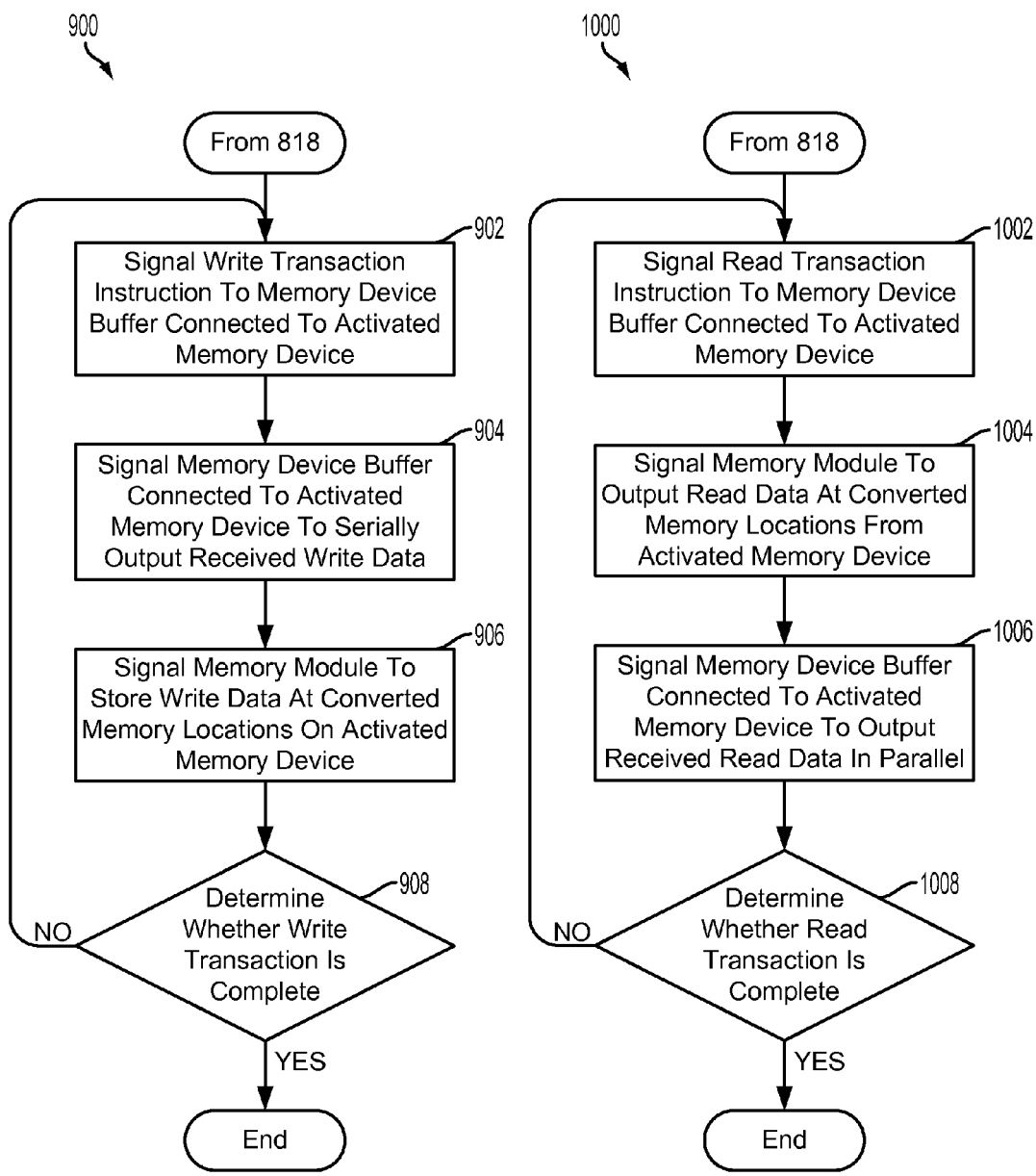

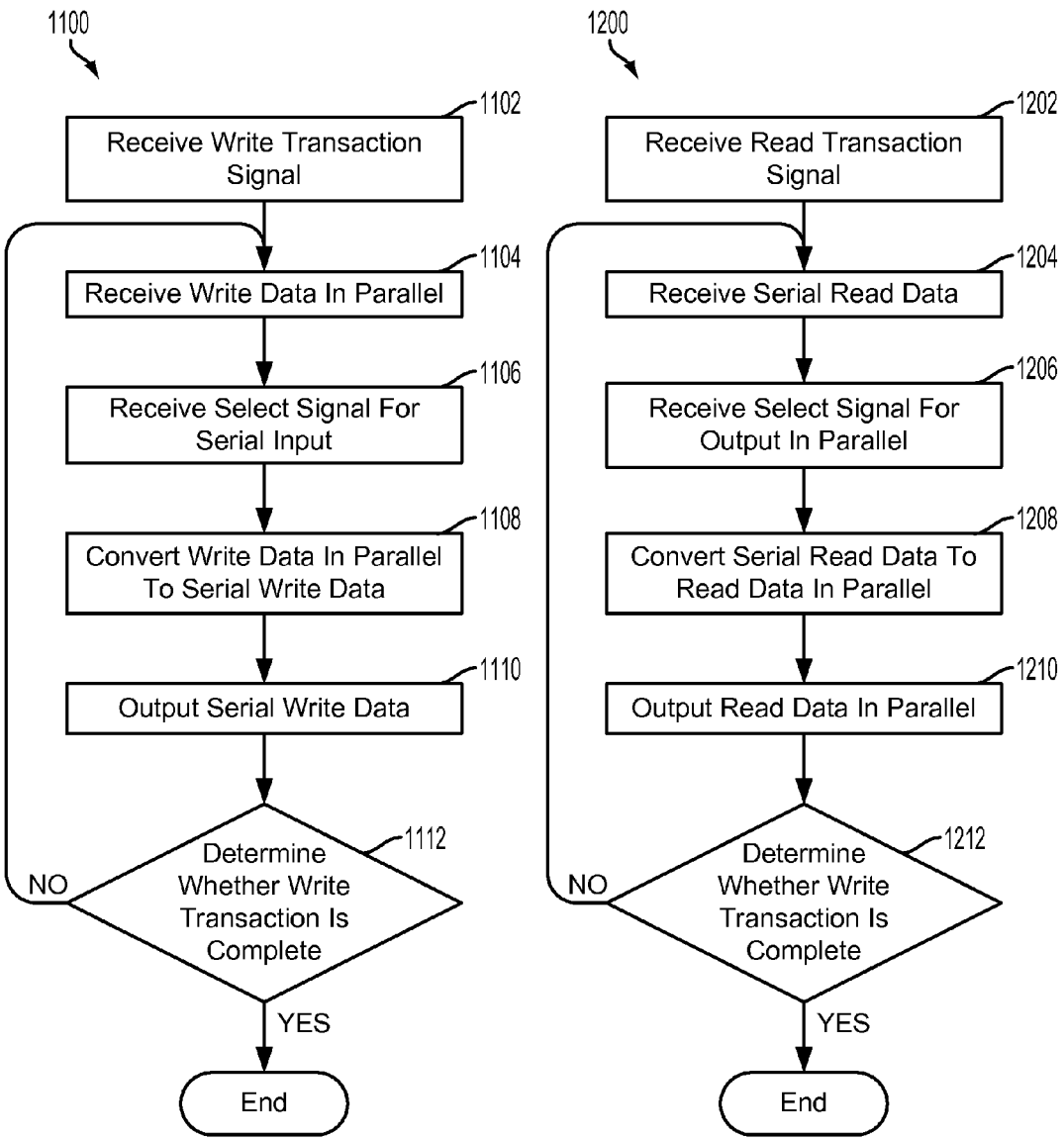

METHOD AND APPARATUS FOR DRAM SPATIAL COALESCING WITHIN A SINGLE CHANNEL

BACKGROUND

Memory footprint (density) in devices is rapidly increasing. The costs of double data rate dynamic random-access memory (DDR DRAM) are decreasing. Operating systems and applications are becoming larger, more complex, and are using more memory. Users load and run programs concurrently, while still expecting good performance and responsiveness. To achieve high performance, systems require a fast and wide memory bus of multiple paralleled memory components operating simultaneously. In such a system, every parallel memory device is energized during a memory transaction from the CPU. This results in high performance at the expense of high power consumption. DDR RAM operations can exceed 15% of the total power consumption of the device, be it a mobile computer, a smart phone, a tablet, a desktop, or another type of mobile device. Under many circumstances (e.g. audio playback), the DDR RAM uses more power than may be necessary to provide adequate performance for the user.

SUMMARY

The methods and apparatuses of various aspects provide circuits and methods for using a plurality of memory devices of a memory module that may include re-ordering a memory map of the plurality of memory devices resulting in a re-ordered memory map such that a data burst for a memory transaction instruction uses less than all of the plurality of memory devices, receiving at least one memory address associated with the memory transaction instruction, converting the at least one memory address to at least one re-ordered memory address according to the re-ordered memory map, and activating less than all of the plurality memory devices to execute the memory transaction instruction for the data burst, wherein the activated less than all of the plurality of memory devices are associated with the at least one re-ordered memory address according to the re-ordered memory map.

In an aspect method, activating less than all of the plurality memory devices to execute the memory transaction instruction for the data burst may include activating each of the less than all of plurality of memory devices individually.

In an aspect method, re-ordering the memory map of the plurality of memory devices resulting in the re-ordered memory map such that the data burst for the memory transaction instruction uses less than all of the plurality of memory devices may include re-ordering the memory map of the plurality of memory devices resulting in the re-ordered memory map such that the data burst for the memory transaction instruction uses one of the plurality of memory devices, and activating less than all of the plurality memory devices to execute the memory transaction instruction for the data burst may include activating one of the plurality of memory devices to execute the memory transaction instruction for the data burst.

In an aspect method, re-ordering the memory map of the plurality of memory devices resulting in the re-ordered memory map such that the data burst for the memory transaction instruction uses less than all of the plurality of memory devices may include re-ordering the memory map of the plurality of memory devices resulting in the re-ordered memory map such that the data burst for the memory transaction instruction uses at least one of the plurality of memory devices of the memory module multiple times.

An aspect method may further include receiving the memory transaction instruction for a write transaction including the data burst and the at least one memory address for writing to the plurality of memory devices, in which the data burst may include write data in parallel, converting at least a portion of the data burst to serial write data for writing to the re-ordered memory address, and outputting the converted write data to at least one of the activated less than all of the plurality of memory devices associated with the re-ordered memory address.

An aspect method may further include receiving the memory transaction instruction for a read transaction including the memory address for reading from the plurality of memory devices, receiving the data burst from at least one of the activated less than all of the plurality of memory devices associated with the re-ordered memory address, wherein at least a portion of the data burst may include serial read data, converting the data burst to read data in parallel format such that the read data in parallel format is ordered to conform with memory addresses of the memory transaction instruction, and outputting the read data in parallel format to a processor.

In an aspect method, re-ordering the memory map of the plurality of memory devices resulting in the re-ordered memory map such that the data burst for the memory transaction instruction uses less than all of the plurality of memory devices may include re-ordering portions of the memory map of the plurality of memory devices using different re-order patterns in which at least one portion of the memory map is re-ordered such that the data burst for the memory transaction instruction uses less than all of the plurality of memory devices.

An aspect includes an apparatus including a memory controller for using a plurality of memory devices of a memory module, in which the memory controller is configured to perform operation may include of one or more of the aspect methods described above.

An aspect includes an apparatus for using a plurality of memory devices of a memory module including means for performing functions of one or more of the aspect methods described above.

An aspect includes non-transitory processor-readable medium having stored thereon processor-executable instructions configured to cause a memory controller to perform operations of one or more of the aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 5 is a schematic diagram illustrating an example re-ordered memory map for a plurality of memory device for minimum power consumption in accordance with an aspect.

FIG. 6 is a schematic diagram illustrating an example re-ordered memory map for a plurality of memory device for latency tolerant processes in accordance with an aspect.

FIG. 9 is a process flow diagram illustrating an aspect method for converting data in parallel format to serial data to write to one or more of a plurality of memory devices.

FIG. 10 is a process flow diagram illustrating an aspect method for converting serial data to data in parallel format to read from one or more of a plurality of memory devices.

FIG. 11 is a process flow diagram illustrating an aspect method for converting data in parallel format to serial data to write to one or more of a plurality of memory devices.

FIG. 12 is a process flow diagram illustrating an aspect method for converting serial data to data in parallel format to read from one or more of a plurality of memory devices.

DETAILED DESCRIPTION

Figure 1:
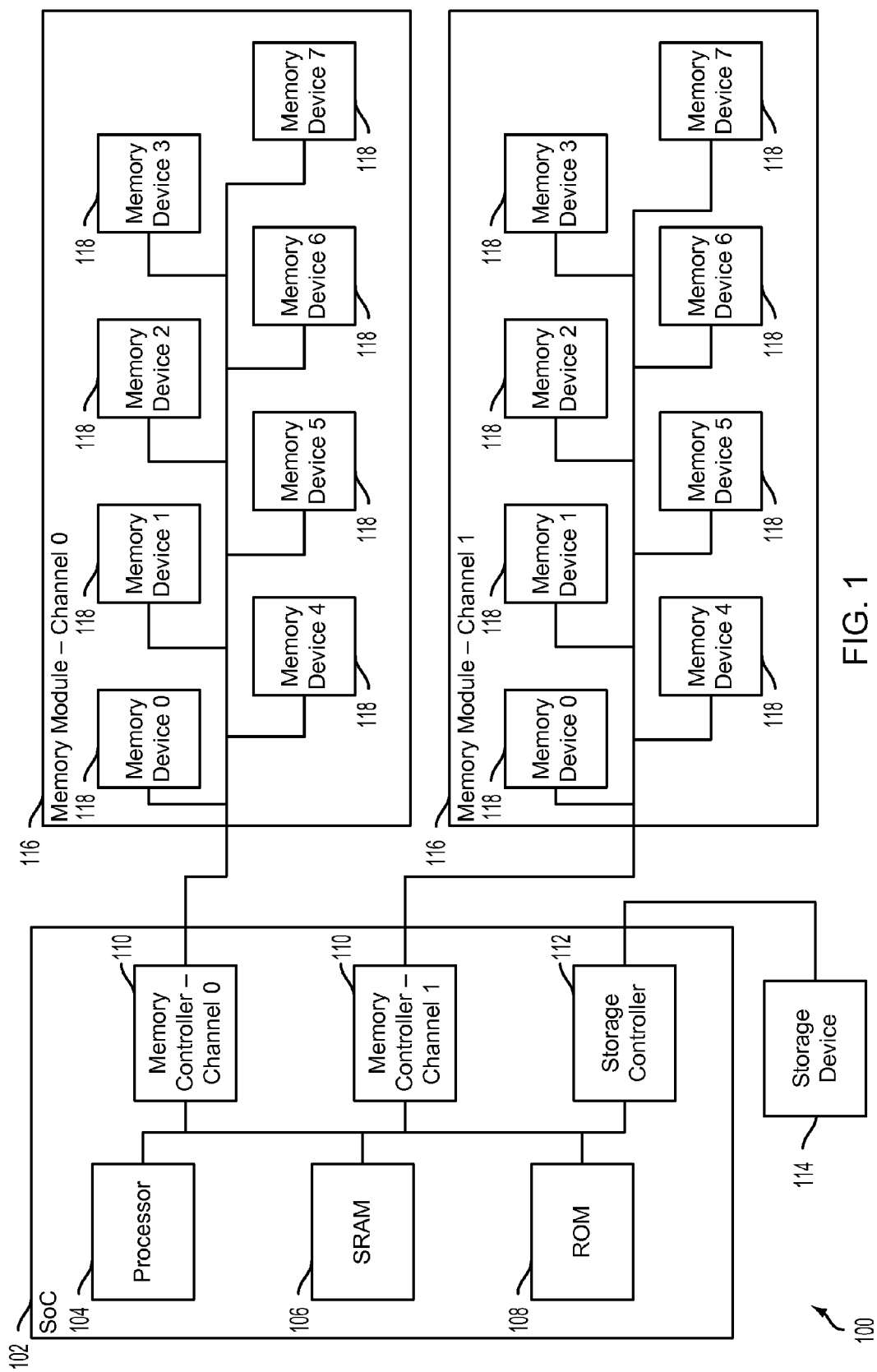
FIG. 1 is a component block diagram illustrating a computing device having a plurality of memory devices on a plurality of memory modules connected to a plurality of memory controllers, each associated with a channel, for DRAM spatial coalescing within a single channel in accordance with an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a programmable processor. While the various aspects are particularly useful for mobile computing devices, such as smartphones, which have limited resources, the aspects are generally useful in any electronic device that implements a plurality of memory device and a limited power budget where reducing the power consumption of the memory devices can extend the life of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The terms "channel" and "memory bus" are used interchangeably herein to refer to a data conduit configured to transmit data between a memory controller and a memory module. Each memory module may be connected to a dedicated channel for the memory module. For example, a device having "x" number of memory modules may have "x" number of channels where each channel corresponds with one memory module. Channels may vary in size, but for ease of reference, the examples discussed herein reference a 64-bit channel capable of transmitting up to 64 bits of data in parallel. These examples are not meant to be limiting because the aspects may be implemented in channels of different sizes. The term "sub-channel" and "memory device bus" are used interchangeably herein to refer to portions of the channel connected to memory devices of the memory module when the memory device of the sub-channel is individually activated or energized.

The term "transaction" refers to the complete transfer of data of a requested size. The term "data burst" refers to a transfer of data over an interface using multiple successive cycles to complete a transfer. A transaction may complete in a single cycle or it may complete in a burst of multiple cycles.

For ease of reference, the examples described herein assume memory modules having eight memory devices or chips. In the examples described herein, the memory device may vary in size and portions of the memory device may be divided into 1-byte or 8 bits. These examples are not meant to be limiting in any way, and the disclosures herein can apply to memory modules and memory devices of varying size and configuration. Further, other components described herein, such as a processor, a memory controller, a data buffer, a device buffer, a first in, first out (FIFO) buffer, a multiplexer, a demultiplexer, a re-order logic, and each of a plurality busses and lines may be alternately configured to support varying sizes and configurations of the memory modules and memory devices.

During a conventional memory read or write transaction, a group of memory devices, such as on one memory module, may be energized for the transaction with a processor of a computing device. For example, in a conventional memory device, when the main memory contains at least one memory module having eight memory devices with each of the memory devices sectioned into multiple segments of 1-byte each, a 64 bit read or write transaction will energize all eight memory devices to access a 1-byte segment of each memory device. In a conventional memory device, the data is written to the group of memory devices in parallel because each memory device can receive data at the same time as another memory device, thereby enabling fast access to large amounts of data. This conventional manner of accessing memory is implemented using a memory map configured for high performance or speed because the 64 bits of data of the transaction may be written to or read from the memory devices in parallel. This manner of accessing memory also uses a large amount of energy because it energizes all of the memory devices for the transaction. However, it may be unnecessary to perform memory read or write transactions at such performance levels when a data burst of a maximum size, in this example 64 bits, can be read or written in parallel. It may also be undesirable to perform memory read or write transactions at such performance levels when a consequence of doing so is the excess use of energy for a device with a limited power budget.

The various embodiments provide methods for storing data in memory of a computing device in a manner that is more power efficient than conventional methods by remapping memory locations for bytes within a transaction so that the bytes of data are stored in a single memory device, rather than across a number of memory devices in parallel. Remapping a data burst in this manner results in only a single memory device being energized to write or read the data, thereby saving the power that would otherwise be required to energize all memory devices for a conventional parallel memory access operation. For ease of reference, the terms "data burst" and "burst of data" are used interchangeably to refer to the amount of data that is output from a processor for storage or requested from memory in a single clock cycle. For example, a 64 bit processor may send 64 bits of data to memory for storage or request 64 bits of data from memory in a single processor clock cycle, so a data burst for such a processor may be eight bytes of data. In the various embodiments, the eight bytes of data in a data burst from/to a 64 bit processor would be re-order in a memory map to be saved in series in a single memory device, instead of saving one byte in each of eight memory devices in parallel.

The process of reordering memory addresses for a data burst using a reordered memory map may be accomplished within a memory access controller (also referred to herein as a "memory controller"), which may be a component of the SoC, the memory device or a separate integrated circuit. An aspect memory access controller may include re-order logic configured to perform the memory mapping of the various aspects. The aspect methods may also or alternatively be performed in re-order logic that is a separate component from a memory access controller. In this manner, the process of reordering bytes within a data burst may be accomplished without imposing requirements on the processor. In other words, the processor may output data to memory and access data from memory using conventional memory addressing techniques, while the memory access controller performs the operations of reordering bytes within data bursts so that the bytes may be stored within memory in an energy-efficient manner. In effect, data output a processor for parallel storage in memory are converted to serial memory addresses by the memory access controller so that the bytes within a data burst are stored in series within a single memory device, while a burst of data read from memory that is stored in a single device in serial format is converted to a parallel format expected by the processor according to the requested memory locations.

In read and write operations, the processor may request a transaction for memory locations for data in parallel. The memory access controller may compare the memory addresses specified by the processor to a re-ordered memory map to determine the re-ordered memory locations of the requested data within particular memory devices. The memory access controller may convert the data between serial and parallel formats, so that the memory device may handle serial data and the processor may handle data in parallel.

In an aspect, a memory access controller may reorder data addresses using a latency tolerant re-ordered memory map that balances performance and energy savings by assigning more than one but less than all of the memory devices to handle a burst of data. In this aspect, rather than maximizing memory access performance by using all of the memory devices in parallel, or minimizing power consumption by using one memory device to handle data burst as described above, a latency tolerant re-ordered memory map may use some, but not all of the memory devices to handle the data burst. In this manner, the re-ordered memory map limits the number of memory devices energized to read or write the data burst. This aspect represents a compromise between the high-performance but high power demand of conventional memory access techniques and the low power but slower memory access provided by the aspect described above.

In an aspect, the re-ordered memory map used by a memory access controller may also be a combination of memory maps. The re-ordered memory map of the memory devices may portion different sections of the memory devices used for different purposes resulting from the different memory maps. For example, the memory access controller may be configured so that a first portion of each memory device may be used to store data in serial format minimum energy consumption, a second portion of each memory device is used for storing data organized for latency tolerance, and a third portion of each memory device used to store data organized for maximum performance. The memory access controller may accomplish such apportioning of memory locations using memory maps, which map data to the appropriate memory portion depending upon the data structure, latency tolerance, or source application for the data. The memory access controller may be configured so that memory addresses within memory devices are apportioned in various different ways and related to various different re-ordered memory maps, and the examples provided herein are not meant to be limiting.

In an aspect, transactions requested by the processor may be assigned to different portions of the memory devices relating to different re-ordered memory maps. The memory access controller (or processor working in conjunction with the memory access controller) may determine the data transactions that are best suited for the different re-ordered memory maps based on instructions in or relating to the processes executed by the processor. Such determinations may be made using indications (e.g., flags, data tags, etc.) provided in the software application that is the source or user of the data, or through analysis of the software application.

FIG. 1 illustrates an example computing device having a plurality of memory devices on a plurality of memory modules connected to a plurality of memory controllers, each associated with a channel in accordance with an aspect. A computing device 100 may include an SoC 102 having a processor 104, a static random-access memory (SRAM) 106, a read only memory (ROM) 108, a memory controller 110, and storage controller 112, each connect to at least the processor 104. The SoC 102 may be connected to a storage device 114 through the storage controller 112. The SoC 102 may be connected to a memory module 116 through the memory controller 110. The memory module 116 may include a memory device 118. Each memory module 116 connected to the SoC 102 may be associated with a channel for transferring data between the memory module 116 and the SoC 102. Each memory device 118 of the memory module 116 may also be associated with the channel of the memory module 116. Each memory module 116 connected to the SoC 102 may be connected through a dedicated memory controller 110, such that each pair of memory module 116 and memory controller 110 are associated with the same channel. The example in FIG. 1 illustrates an aspect computing device 100 having one SoC 102 connected to two memory modules 116 (memory module—channel 0, memory module—channel 1), each memory module 116 containing eight memory devices 118 (memory devices 0-7), and each memory module 116 connected to its dedicated memory controller 110 (memory controller—channel 0, memory controller channel 1). The number of SoCs 102, memory modules 116, memory devices 118, and memory controllers 110, and therefore channels, in this example are not meant to be limiting in any way, and the configuration of the components of the computing device 100 may vary.

In the computing device 100, the processor 104 may make transaction requests to read from or write data to specific memory locations of the various memory devices 118. The memory controller 110 associated with the memory locations for the requested transaction may receive the data transaction request, and control how the data of the transaction request is read from or written to the memory devices 118. As discussed in further detail below, the memory controller 110 may re-order the memory map for the memory devices 118, control the flow and format of the data, and control the memory devices 118 that are energized and the memory locations that are used for the transaction.

Figure 2:
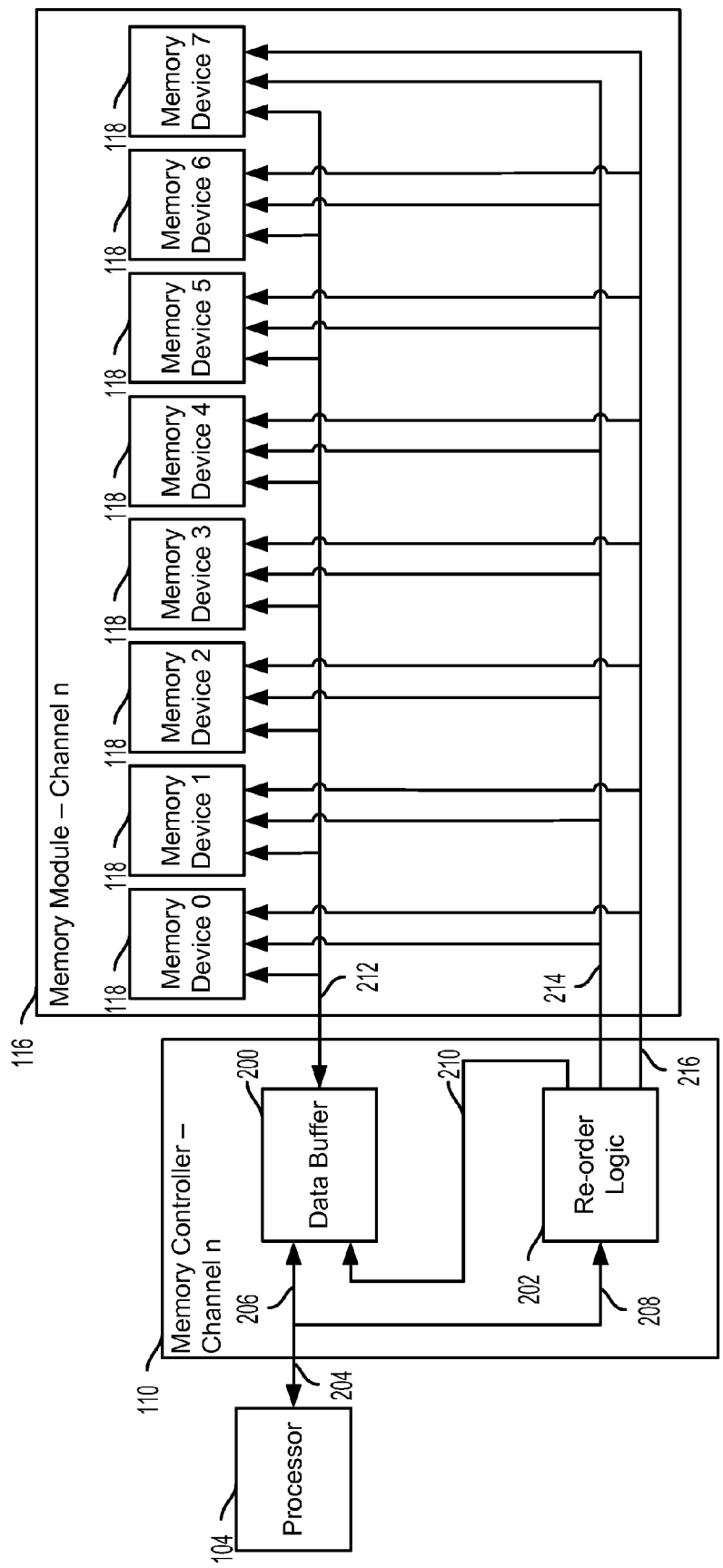
FIG. 2 is a component block diagram illustrating a computing device having a plurality of memory devices on a memory module connected to a memory controller, each associated with a channel, for DRAM spatial coalescing within a single channel in accordance with an aspect.

FIG. 2 illustrates a computing device having a plurality of memory devices on a memory module 118 connected to a memory controller 110, each associated with a channel. The memory controller 110 and memory module 118 may be number "n" of any number of memory controllers 110 and memory modules 118 associated with the "n" number channel. The memory controller 110 may include a data buffer 200 and a re-order logic 202. The computing device processor 104 may be connected to the memory controller 110 by a transaction bus 204, which may be configured to transfer data, memory locations or addresses, and transaction signals between the processor 104 and the memory controller 110. A processor data bus 206 may transfer the data between the transaction bus 204 and the data buffer 200. A processor address bus 208 may transfer the memory locations specified by the processor 104 for the transaction and the transaction signal specifying whether the requested transaction is a read or write transaction. A data buffer control bus 210 may transfer control signals to the data buffer 200 from the re-order logic 202 which may include signals for converting the data between data in parallel format and serial data, and receiving the data from the processor 104 or the memory devices 118.

The data buffer 200 may also connect to the memory devices 118 by a memory data bus 212. Each of the memory devices 118 may connect to the same memory data bus 212 and the same data buffer 200 in parallel. Thus, in the example of a 64 bit memory data bus, each of the memory devices 118 may be connect to the entire 64 bit memory data bus. In an aspect, each of the memory devices 118 may connect to the same data buffer 200 by portions of the memory data bus 212. In another example of a 64 bit memory data bus, each of the memory devices 118 may be connected to a portion of the 64 bit memory data bus, such that each memory device 118 may receive or transmit data only on the portion to which its connected. For example, the 64 bit memory data bus may be connected to eight memory devices 118, each connected to an 8 bit portion of the 64 bit memory data bus. Similar examples may include the memory devices 118 connected to unequally sized portions of the memory data bus 212. These configurations allow the memory data bus 212 to transfer data between the memory devices 118 and the data buffer 200 in parallel and in series.

The re-order logic 202 may connect to the memory devices 118 by a memory address and control bus 214 and a memory device select bus 216. The memory address and control bus 214 may transmit signals from the re-order logic 202 to the memory devices 118 so that the memory devices 118 store the data to or release the data from specific memory locations. The memory device select bus 216 may transfer signals from the re-order logic 202 to the memory devices 118 to energize the memory devices 118. The memory device select bus 216 may include a dedicated line for each connected memory device 118 and the re-order logic 202 may select the dedicated line connected to the specific memory device 118 the re-order logic 202 selects to energize. Energizing the individual memory devices 118 may create the sub-channels on the memory data bus 212.

The re-order logic 202 may also be configured to re-order memory maps for the memory devices 118. As described above, the memory maps may be re-ordered to minimize power consumption by the memory devices 118, to maximize performance speed, and/or to balance power consumption and performance speed. The re-ordered memory maps may be used to associate processor provided memory locations, as part of a transaction request, to re-ordered memory locations of the memory devices 118 that achieve the goals of the re-ordered memory maps. In this manner, the processor 104 may request a transaction for data at specified memory locations, and the memory controller 110 may control where the data is written to or read from the memory devices 118 according to the goals of the re-ordered memory maps without the processor 104 changing the memory locations it associates with the data of the transaction. The processes for re-ordering the memory maps and how the re-ordered memory maps are used are described further below.

Figure 3:
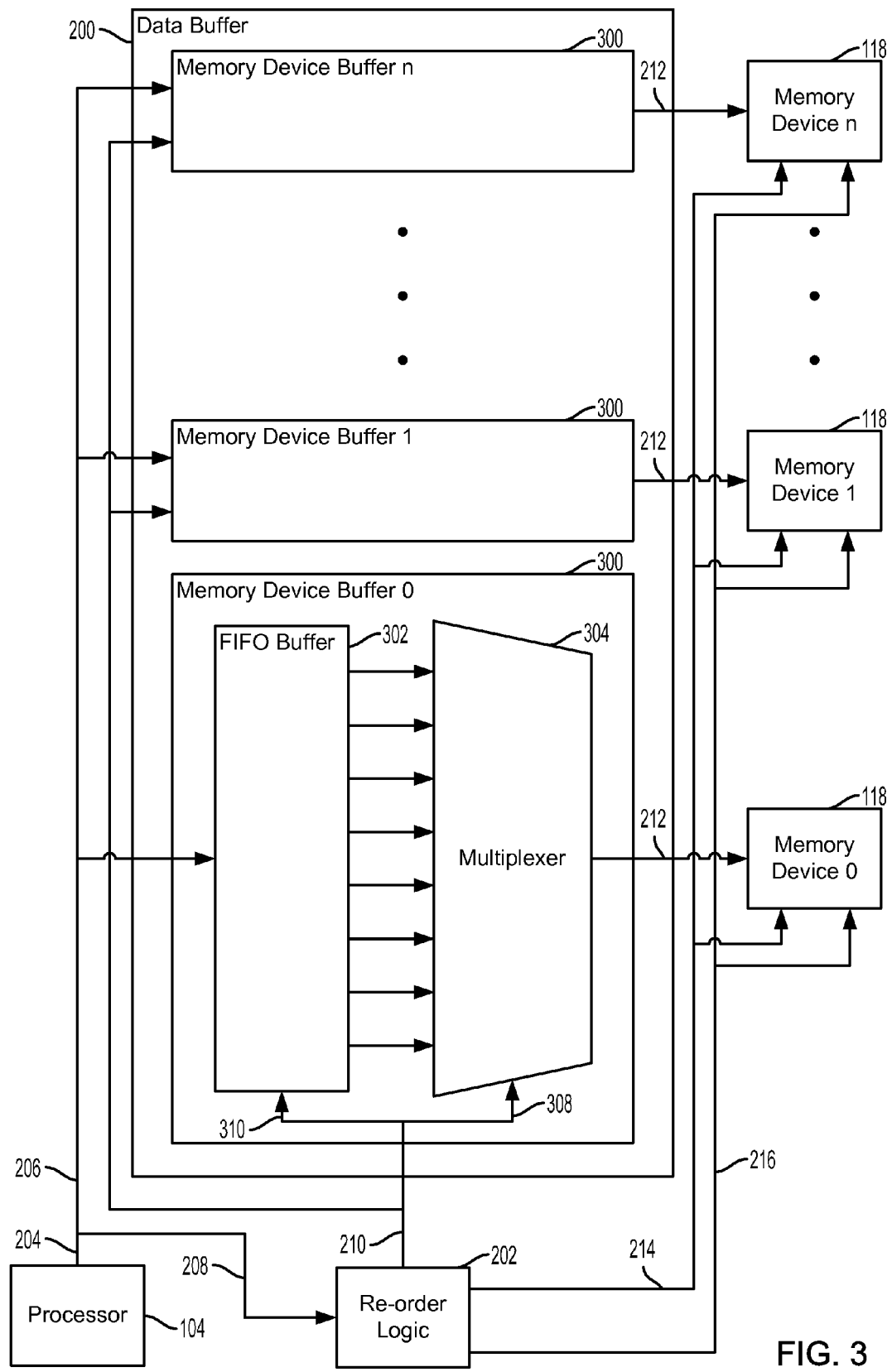
FIG. 3 is a component block diagram illustrating a computing device configured to convert data in parallel format to serial data and to write the serial data to one or more of a plurality of memory devices in accordance with an aspect.

FIG. 3 illustrates a computing device configured to convert data in parallel format to serial data and to write the serial data to one or more of a plurality of memory devices. The data buffer 200 may include a memory device buffer 300, which may include a first in, first out (FIFO) buffer 302, and a multiplexer 304. The data buffer 200 may include a plurality of the memory device buffers 300 (memory device buffer 0, memory device buffer 1, to memory device buffer n). For example, the data buffer 200 may include as many of the memory device buffers 300 as there are memory devices 118 connected to the data buffer 200 (memory device 0, memory device 1, to memory device n).

Each of the memory device buffers 300 may connect to the memory devices 118 by the memory data bus 212. In an aspect, each of the memory device buffers 300 may be connected to all of the memory devices 118 connected to the data buffer 200 in parallel. In another aspect, each of the memory device buffers 300 may be connected to one or more dedicated memory devices 118 connected to the data buffer 200 by a portion of or a separate memory data bus 212.

The processor 104 may be connected to the data buffer 200 as described above, and further connected to each of the memory device buffers 300 in parallel by the transaction bus 204 and the processor data bus 206. In connecting to the memory device buffers 300, the processor 104 may also connect with the FIFO buffers 302 of each of the memory device buffers 300.

The re-order logic 202 may connect to the memory devices 118 by the memory address and control bus 214 and the memory device select bus 216, and to the data buffer 200 by the data buffer control bus 210 as described above. The re-order logic may further connect to the FIFO buffers 302 of each of the memory device buffers 300 by a FIFO control bus 310, and to the multiplexers 304 of each of the memory device buffers 300 by a multiplexer select bus 308.

In operation, an aspect method for performing a data transaction may proceed as follows. The processor 104 may request a write transaction, and the memory controller may receive the write transaction request from the processor 104 on the transaction bus 204. The memory controller may route the transaction signal (in this example a write signal) and the processor provided memory locations to the re-order logic 202 on the processor address bus 208. The re-order logic 202 may receive the processor provided memory locations. The re-order logic 202 may compare the processor provided memory locations to the re-ordered memory map to determine the re-ordered memory locations of the memory devices 118 associated with the processor provided memory locations. The re-order logic 202 may determine the memory device buffer 300 connected to the memory device 118 associated with the identified re-ordered memory locations for the transaction. The re-order logic 202 may also receive the transaction signal and recognize the transaction signal as a write request. In response to the transaction signal, the re-order logic 202 may signal the FIFO buffer 302 of the identified memory device buffer 300, by the FIFO control bus 310, to enable storing the incoming data from the processor 104. The memory controller may route the data of the write transaction request to the memory device buffers 300 on the processor data bus 206 and the enabled FIFO buffer 302 may store the data. The FIFO buffer 302 may receive the data in parallel, so there is no temporal order in which the data is received. However, inputs of the FIFO buffer 302 may each connect to a specific portion, or line, of the processor data bus 206. How the data is organized on the processor data bus 206 may determine how the FIFO buffer 302 stores the data. A bit of data on the portion of the processor data bus 206 connected to an input of the FIFO buffer 302 associated with a first location on the FIFO buffer 302 may be considered the first in data. The bit of data on a next portion of the processor data bus 206 connected to a next input of the FIFO buffer 302 associated with a next location on the FIFO buffer 302 may be considered the next in data, and so on for each input of the FIFO buffer 302 in sequence.

The re-order logic 202 may also signal the multiplexer 304 of the identified memory device buffer 300 to convert the data that the multiplexer 304 receives from the FIFO buffer 302 from parallel data format to serial data. In an aspect, the multiplexer 304 may be, for example, a 64-to-8 multiplexer. Meaning, that the multiplexer 304 includes 64 inputs and eight outputs, where each of the inputs and outputs can manage 1 bit of data at a time. The multiplexer 304 may be alternatively identified as an 8-to-1 multiplexer having eight inputs and one output each able to manage 1-byte of data at a time. A select signal received by the multiplexer 304 from the re-order logic 202 by the multiplexer select bus 308 may control the multiplexer inputs selected for output. The re-order logic 202 may send select signals to the multiplexer 304 in an order such that a first input of the multiplexer 304 output by the multiplexer 304 may be connected to the output of the FIFO buffer 302 associated with the first location on the FIFO buffer 302. In an aspect the select signals may indicate to the multiplexer 304 that the first input of the multiplexer 304 output by the multiplexer 304 may be connected to the output of the FIFO buffer 302 associated with the first eight locations on the FIFO buffer 302. The next select signal sent by the re-order logic 202 may signal the multiplexer 304 to output the next bit or byte of data on the FIFO buffer 302, and so on until the multiplexer 304 has output all of the data stored on the FIFO buffer 302 in a serial manner.

The memory data bus 212 may transfer the serial data output by the multiplexer 304 to the memory device 118. As described above, the memory device buffer 300 having the multiplexer 304 may connect to one or more dedicated memory devices 118, or connect to all of the memory devices 118 connected to the data buffer 200 in parallel. No matter how the memory device buffer 300 having the multiplexer 304 connects to the one or more memory devices 118, the re-order logic 202 may select the appropriate memory device 118 to receive the serial data. Based on the re-order logic's comparison between the processor provided memory locations to the re-ordered memory map, the re-order logic 202 may determine which re-ordered memory locations are associated with the processor provided memory locations. The re-order logic 202 may identify which memory devices 118 are associated with the re-ordered memory locations. The re-order logic 202 may select and activate the appropriate memory device 118 using the memory device select bus 216. The re-order logic 202 may select and enable the memory device select bus 216 connected to the selected memory device 118 to awaken the related memory device 118 from standby. Activating the related memory device 118 may create the sub-channel between the memory controller and the memory device 118. The re-order logic 202 may also transmit signals to the selected memory device 118 on the memory address and control bus 214, indicating to the memory device 118 that it is to store the serial data and the re-ordered memory locations at which to store the serial data.

In an aspect, the re-order logic 202 may signal the data buffer 200 to partially serialize the write data. The re-order logic 202 may determine that the processor provided memory locations are associated with the re-ordered memory map, or a portion of the re-ordered memory map, for latency tolerant processes. Depending on the configuration of the re-ordered memory map for latency tolerant processes, a varying number of less than "n" number of the memory devices 118 may be used for the write transaction. Using less than "n" number of the memory devices 118 for the write transaction may require using more than one memory location of at least one of the memory devices 118. The configuration of the re-ordered memory map for latency tolerant processes may limit the number of memory devices 118 written to in parallel. As such, the re-order logic 202 may enable the FIFO buffers 302 of the memory device buffers 300 associated with the less than "n" number of the memory devices 118. The enabled FIFO buffers 302 may receive the data from the processor 104 in parallel and store the data as described above. The re-order logic may signal the multiplexers 304 connected to the enabled FIFO buffers 302 to output different portions of the data stored in the FIFO buffers 302. For example, where all of the FIFO buffers 302 may have the same data stored and portioned in the same manner, the re-order logic 202 may signal a first multiplexer to output a first portion of the data stored on its connected FIFO buffer. The re-order logic may signal a second multiplexer to output a second portion of the data stored on its connected FIFO buffer, and so on until reaching the limit of memory devices 118 set by the re-ordered memory map. When the FIFO buffers 302 still have data to write to the memory devices 118, the re-order logic may serialize the data such that it may signal the first multiplexer to output a next portion of the data not yet output my any of the multiplexers 304. This process may continue in this manner until all of the data stored on the FIFO buffers 302 for the transaction are written to the appropriate memory devices 118.

Figure 4:
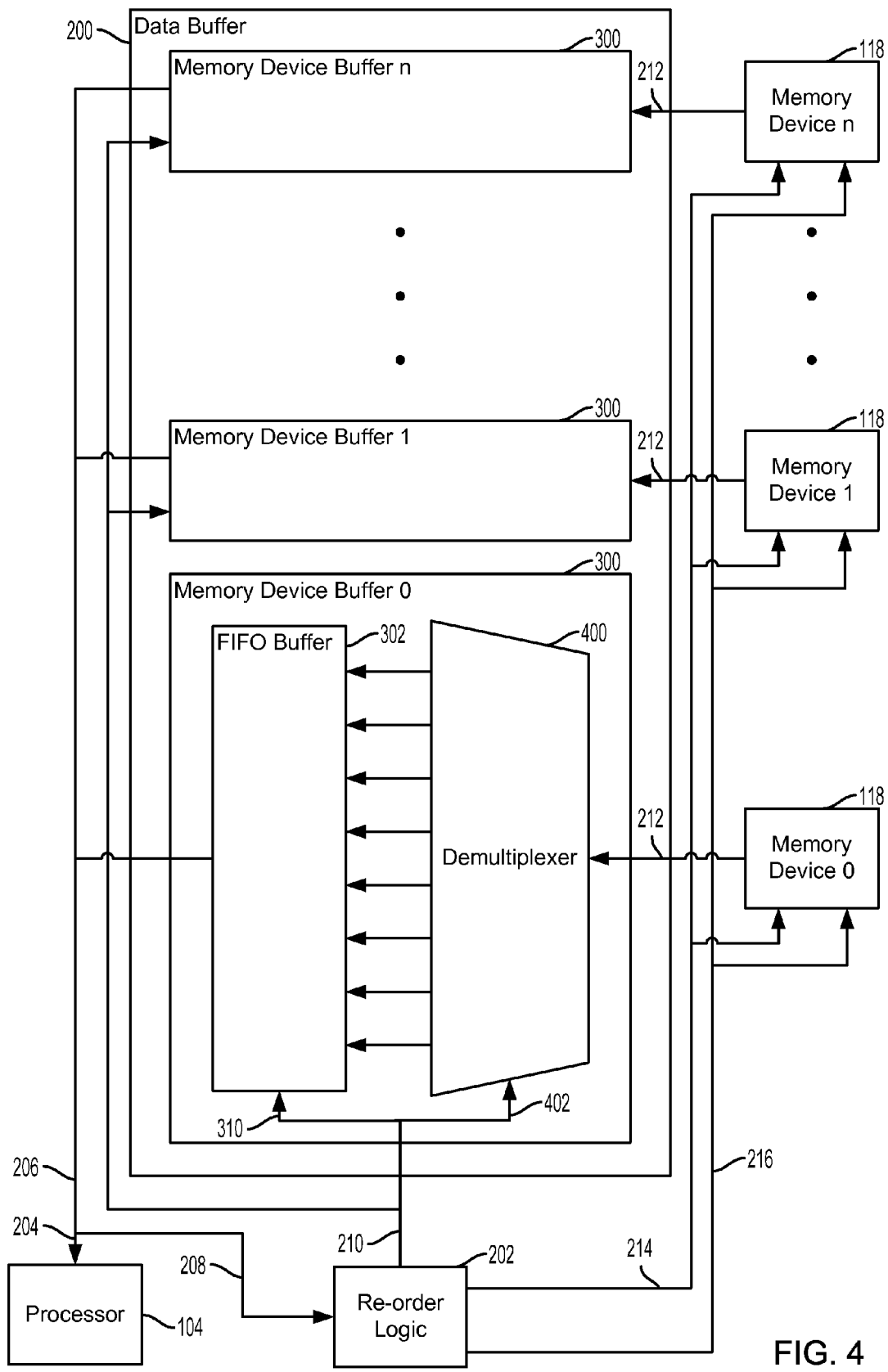
FIG. 4 is a component block diagram illustrating a computing device configured to read serial data from one or more of a plurality of memory devices and to convert the serial data to data in parallel format and in accordance with an aspect.

FIG. 4 illustrates a computing device configured to read serial data from one or more of a plurality of memory devices and to convert serial data to data in parallel. In addition to the components described in FIG. 3, each of the memory device buffers 300 may include a demultiplexer 400 connected to the same or another FIFO buffer 302. The demultiplexers 400 may connect to the memory devices 118 by the memory data bus 212 in same manner as the multiplexers 304 described above. The demultiplexers 400 may also connect to the re-order logic by a demultiplexer select bus 402 and the data buffer control bus 210.

In an aspect, the processor 104 may request a read transaction. The memory controller may receive the read transaction request from the processor 104 on the transaction bus 204. The memory controller may route the transaction signal (in this example a read signal) and the processor provided memory locations to the re-order logic 202 on the processor address bus 208. The re-order logic 202 may compare the processor provided memory locations to the re-ordered memory map and determine which re-ordered memory locations of the memory devices 118 are associated with the processor provided memory locations. Based on the re-order logic's comparison between the processor provided memory locations to the re-ordered memory map, the re-order logic 202 may identify the memory devices 118 associated with the re-ordered memory locations. The re-order logic 202 may select and activate the appropriate memory device 118 using the memory device select bus 216. The re-order logic 202 may select and enable the line of the memory device select bus 216 connected to the selected memory device 118 to awaken the related memory device 118 from standby. The re-order logic 202 may also transmit signals to the selected memory device 118 on the memory address and control bus 214, indicating to the memory device 118 the re-ordered memory locations at which the requested data is stored on the memory device 118, and to release the serial data stored at the specified re-ordered memory locations to the appropriate data buffer 300.

The memory device data bus 212 may transfer the serial data from the memory device 118 to the data buffer 300. As described above, the memory device buffer 300 having the demultiplexer 400 may be connected to one or more dedicated memory devices 118, or connected to all of the memory devices 118 connected to the data buffer 200 in parallel. No matter how the memory device buffer 300 having the demultiplexer 400 is connected to the one or more memory devices 118, the re-order logic 202 may select the appropriate memory device buffer 300 to received the serial data. Based on the re-order logic's comparison between the processor provided memory locations to the re-ordered memory map, the re-order logic 202 may identify the memory device buffer 300 associated with the re-ordered memory locations and the memory device 118. In an aspect, the amount of data involved in the transaction may be less than or equal to the amount of data one of the FIFO buffers 302 can manage. In such a circumstance it may not be necessary to select a particular memory device buffer 300, as the memory device buffers 300 may connect to the processor 104 in parallel. In another aspect, the amount of data involved in the transaction may be greater than the amount of data one of the FIFO buffers 302 can manage, and the memory controller must reconstruct a stream of data requiring multiple bursts to deliver the data to the processor 104. In such a circumstance it may or may not be required to select appropriate memory device buffers 300 to deliver the data to the processor 104 in the expected order.

The re-order logic 202 may also signal to the demultiplexer 400 of the identified memory device buffer 300 to convert the data the demultiplexer 400 receives from the memory device 118 from serial data to data in parallel. In an aspect, the demultiplexer 400 may be, for example, an 8-to-64 demultiplexer. Meaning, that the demultiplexer 400 includes eight inputs and 64 outputs, where each of the inputs and outputs can manage 1 bit of data at a time. The demultiplexer 400 may be alternatively identified as a 1-to-8 demultiplexer having one input and eight outputs each able to manage 1-byte of data at a time. A select signal received by the demultiplexer 400 from the re-order logic 202 by the demultiplexer select bus 402 may control the demultiplexer inputs selected for output. The re-order logic 202 may also signal the FIFO buffer 302 by FIFO control bus 310 to store data received from the demultiplexer 400. The data outputs of the demultiplexer 400 may be received by the FIFO buffer 302, where each output of the demultiplexer 400 may be connected to an input of the FIFO buffer 302 associated with a location on the FIFO buffer 302. A demultiplexer output received on a FIFO buffer input associated with a first location on the FIFO buffer 302 may be considered the first in data. The next demultiplexer output received on a next input of the FIFO buffer 302 associated with a next location on the FIFO buffer 302 may be considered the next in data, and so on for each input of the FIFO buffer 302 in sequence. When the demultiplexer 400 outputs the serial data to the FIFO buffer 302, it may output to each input of the FIFO buffer 302 in sequence for the amount of data received by the demultiplexer 400. The re-order logic 202 may send select signals to the demultiplexer 400 in an order such that the serial data received by the demultiplexer 400 is output by the demultiplexer 400 in the order it is received.

The re-order logic 202 may control the output of the serial data received by the demultiplexer 400, such that the data is received by the FIFO buffer 302 in a manner that when the FIFO buffer 302 outputs the data to the processor 104, the serial data is converted to a parallel data format in the order requested by the processor 104. When the FIFO buffer 302 has received all of the serial data from the demultiplexer 400, memory controller may release the data stored in the FIFO buffer 302 in parallel to the processor 104 by the transaction bus 204.

In an aspect, the data received by the demultiplexers 400 may be only be partially in parallel and partially serialized. As described above, write data may be partially serialized and written to the memory devices 118 for the re-ordered memory map for latency tolerant processes. In a read transaction for memory locations of the re-ordered memory map for latency tolerant processes, the re-order logic 202 may control the demultiplexers 402 and the FIFO buffers 302 to convert the partially in parallel and partially serialized data to date in parallel. The re-order logic 202 may receive the processor provided memory locations and use them to identify the re-ordered memory locations and the memory device 118 for the requested data. The re-order logic 202 may also identify the associated memory device buffers 300. The re-order logic 202 may signal the memory devices 118 to release data from the re-ordered memory locations, and the data may be received by the demultiplexers 402 of the associated memory device buffers 300. The re-order logic 202 may signal each demultiplexer 402 receiving a portion of the data in parallel format to output the data to an appropriate input of its connected FIFO buffer 302 such that the data is output by the FIFO buffer 302 to the portion of the processor data bus 206 on which the processor 104 expects the data. The re-order logic 202 may also signal each demultiplexer 402 receiving a partially serialized portion of the data to again output the data to the appropriate input of its connected FIFO buffer 302 in according to a similar scheme. In this manner, the data is formatted into a parallel data format and the data on each portion of the processor data bus 206 is as expected by the processor 104 according to the processor provided memory locations.

For a typical memory module, the computing device may implement the memory map configured for maximum performance speed. The typical memory module may be configured to handle transactions for data bursts of N bytes in length, the data may be broken into 1-byte chunks, each 1-byte chunk written to or read from one memory location of each of N number memory devices of the typical memory module. In this typical memory module example, each of the N number memory modules must be energized to store or output the 1-byte chunk of data. For example, an 8 byte transaction may send a 1-byte chunk to eight memory devices all at once.

FIG. 5 illustrates an example re-ordered memory map for a plurality of memory devices for minimum power consumption. In an aspect, a re-ordered memory map for minimum power consumption 500 may be supported by the memory module having the memory device select bus connected to each memory device so that each memory device may be energized individually. The re-ordered memory map for minimum power consumption 500 may assign the memory locations of the N number memory devices such that one whole data burst of N bytes in length may be written to or read from N number memory locations of one of the memory devices. In this aspect, only one memory device may be energized to store or output all of the 1-byte chunks of data.

Similarly, if a transaction of multiple data bursts of N bytes in length occurs, the re-ordered memory map for minimum power consumption 500 may assign the memory locations of the N number memory devices such that each successive data burst may be written to or read from the next memory device in sequence. When the number of data bursts exceeds the number of memory devices, the re-ordered memory map for minimum power consumption 500 may assign the memory locations such that the successive data bursts may be written to or read from the next set of N number memory locations of the memory devices in the same order as the first N number data bursts. In situations with multiple data burst transactions, only the necessary number of memory devices according to the re-ordered memory map for minimum power consumption 500 may be energized.

As illustrated in FIG. 5, an aspect re-ordered memory map for minimum power consumption 500 may be represented as a table having a plurality of columns, where each column may represent a memory device (memory device 0-7) of a memory module. Each cell of the table may represent a location within the respective memory devices, and the numerals may represent the order in which the re-ordered memory map for minimum power consumption 500 may assign the memory locations for use. This aspect re-ordered memory map for minimum power consumption 500 assumes that the processor transacts in 8 byte data bursts, however the re-ordered memory map for minimum power consumption 500 may be configured to handle a variety of data burst lengths.

The re-order logic may re-order an existing memory map, for example the memory map configured to achieve maximum performance speed as described above, to create the re-ordered memory map for minimum power consumption 500. As illustrated, each memory device may be assigned an order of use in eight 1-byte groups, or in 64 bits. For example, the re-ordered memory map for minimum power consumption 500 may assign memory device 1 the first eight assigned 1-byte memory locations for use (memory locations 0-7). The re-ordered memory map for minimum power consumption 500 may assign memory device 2 the second eight 8 byte memory locations for use (memory locations 8-15), and so on until memory device 7. The same pattern may repeat, assigning successive 8 byte chunks of memory across the memory devices, until all of the memory locations are assigned, such that the re-ordered memory map for minimum power consumption 500 may apply to all of the memory locations of the memory devices. In an aspect, the re-ordered memory map for minimum power consumption 500 may apply to portions of the memory locations of the memory devices, rather than all of the memory locations of the memory devices.

FIG. 6 illustrates an example re-ordered memory map for a plurality of memory device for latency tolerant processes. In an aspect, a re-ordered memory map for latency tolerant processes 600 may be supported by the memory module having the memory device select bus connected to each memory device so that each memory device may be energized individually. The re-ordered memory map for latency tolerant processes 600 may assign the memory locations of the N number memory devices such that the data burst of N bytes in length may be written to or read from one or more memory locations of less than N number of the memory devices. In other words, a first portion of the data burst, less than the entire data burst, may be assigned to a first memory location for the number of memory devices equal to the number of bytes for the portion of the data burst. Further, the remainder of the data burst may be assigned to a second memory location of the same memory devices until the entire data burst is assigned. It may possible that the portion of the data burst is small enough to require more memory locations of the same memory devices. In this aspect, only a number of the memory devices equal to the number of bytes in the portions of the data burst may be energized to store or output all of the data burst.

Similarly, if a transaction of multiple data bursts of N bytes in length occurs, the re-ordered memory map for latency tolerant processes 600 may assign the memory locations of the N number memory devices such that each successive data burst may be written to or read from the next memory location of the less than N number of memory devices in sequence. When the data bursts exceed the capacity of a first group of memory locations across the less than N number of memory devices, for example, at least eight memory locations across the less than N number of number of memory devices, the re-ordered memory map for latency tolerant processes 600 may assign the memory locations such that the successive data bursts may be written to or read from a next group of memory locations across the next group of less than N number of memory devices. In situations with multiple data burst transactions, only the necessary number of memory devices according to the re-ordered memory map for latency tolerant processes 600 may be energized.

As illustrated in FIG. 6, an aspect re-ordered memory map for latency tolerant processes 600 may be represented as a table similar to the table in FIG. 5. This aspect re-ordered memory map for latency tolerant processes 600 assumes that the processor transacts in 8 byte data bursts; however, the re-ordered memory map for latency tolerant processes 600 may be configured to handle a variety of data burst lengths.

The re-order logic may re-order an existing memory map, for example the memory map configured to achieve maximum performance speed as described above, to create the re-ordered memory map for latency tolerant processes 600. As illustrated, groups of four memory devices may be assigned an order of use in eight 1-byte groups, or in 64 bits. For example, the re-ordered memory map for latency tolerant processes 600 may assign memory device 1 the first assigned 1-byte memory location for use (memory location 0), memory device 2 the second 1-byte memory location for use (memory location 1), and so on until memory device 3. The re-ordered memory map for latency tolerant processes 600 may assign the same memory devices (memory devices 0-3) in the same manner through memory location 31. The re-ordered memory map for latency tolerant processes 600 may continue with memory devices 4-7 assigning memory locations 32-63 in the same manner. The same pattern may repeat, assigning successive 32 bytes of memory across the memory devices, until all of the memory locations are assigned, such that the re-ordered memory map for latency tolerant processes 600 may apply to all of the memory locations of the memory devices. In an aspect, the re-ordered memory map for latency tolerant processes 600 may apply to portions of the memory locations of the memory devices, rather than all of the memory locations of the memory devices.

Figure 7:
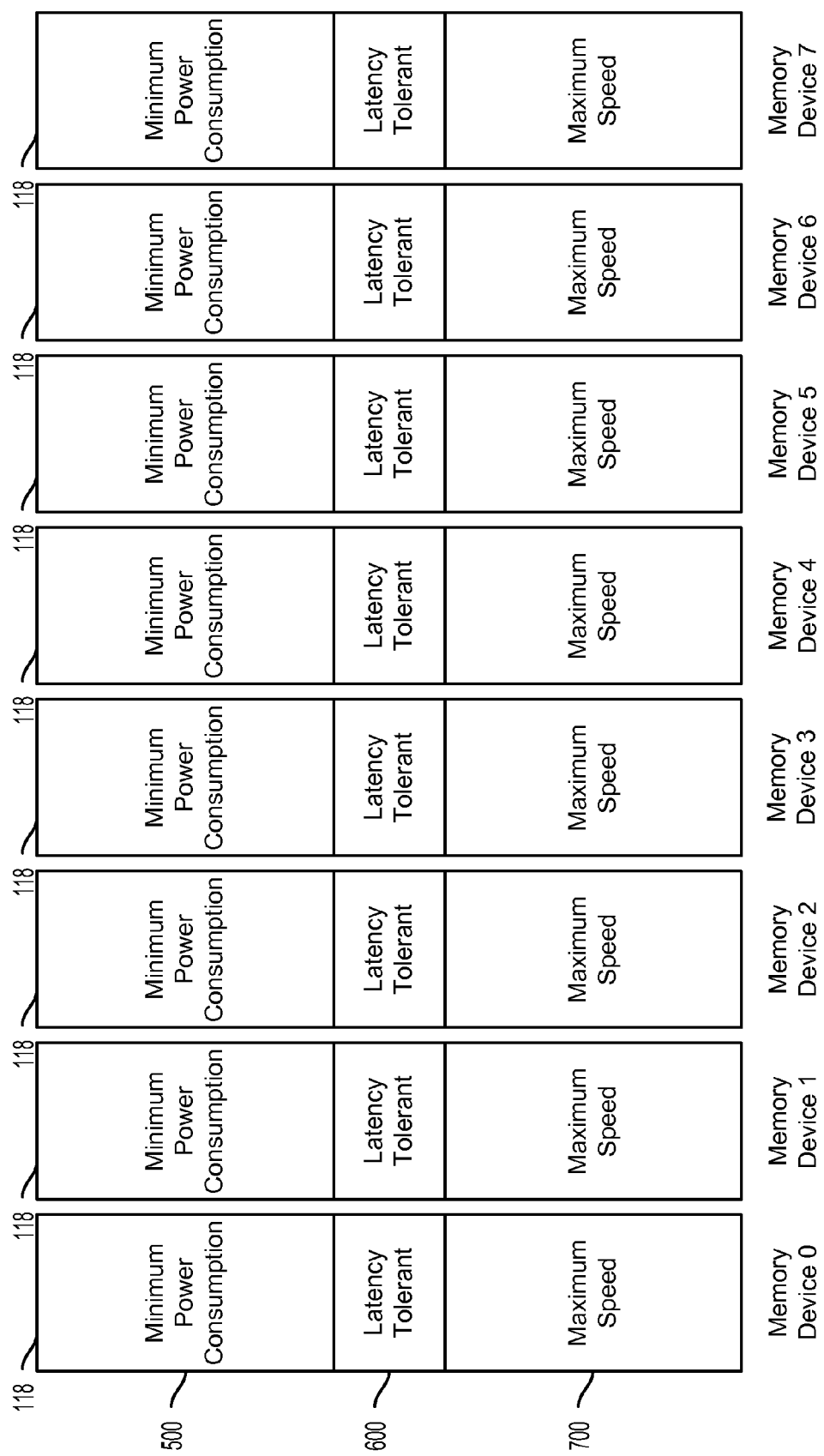
FIG. 7 is a schematic diagram illustrating an example application of a plurality of memory maps to a plurality of memory devices for DRAM spatial coalescing within a single channel in accordance with an aspect.

FIG. 7 illustrates an example application of a plurality of memory maps to a plurality of memory devices. In an aspect the computing device may apply multiple memory maps across the plurality of memory devices 118. Each of the memory maps may apply to a range of memory locations of each memory device 118. In an aspect, the memory maps apply to equivalent ranges of memory locations across each of the memory devices 118 for the respective memory maps. For example, the re-ordered memory map for minimum power consumption 500 may apply across an upper portion of the memory locations of each of the memory devices 118 corresponding to the upper physical addresses within each memory device 118. The re-ordered memory map for latency tolerant processes 600 may apply across a middle range of memory locations of each of the memory devices 118 corresponding to a range of physical addresses within each memory device 118 between the upper and the lower physical addresses within each memory device 118. A re-ordered memory map for maximum performance speed 700 may apply across a bottom range of memory locations of each of the memory device 118 corresponding to the lower physical addresses within each memory device 118. In various aspects, different combinations of the re-ordered memory maps 500, 600, 700 may be applied across different ranges of memory locations of each of the memory devices 118. It may be possible to have similar re-ordered memory maps applied across different ranges of memory locations of each of the memory devices 118. For example, the re-ordered memory map for minimum power consumption 500 and/or the re-ordered memory map for maximum performance speed 700 may be applied across multiple ranges of memory locations of each of the memory devices 118. Also, the same and/or different versions of the re-ordered memory map for latency tolerant processes 600 may be applied across multiple ranges of memory locations of each of the memory devices 118.

Figure 8:
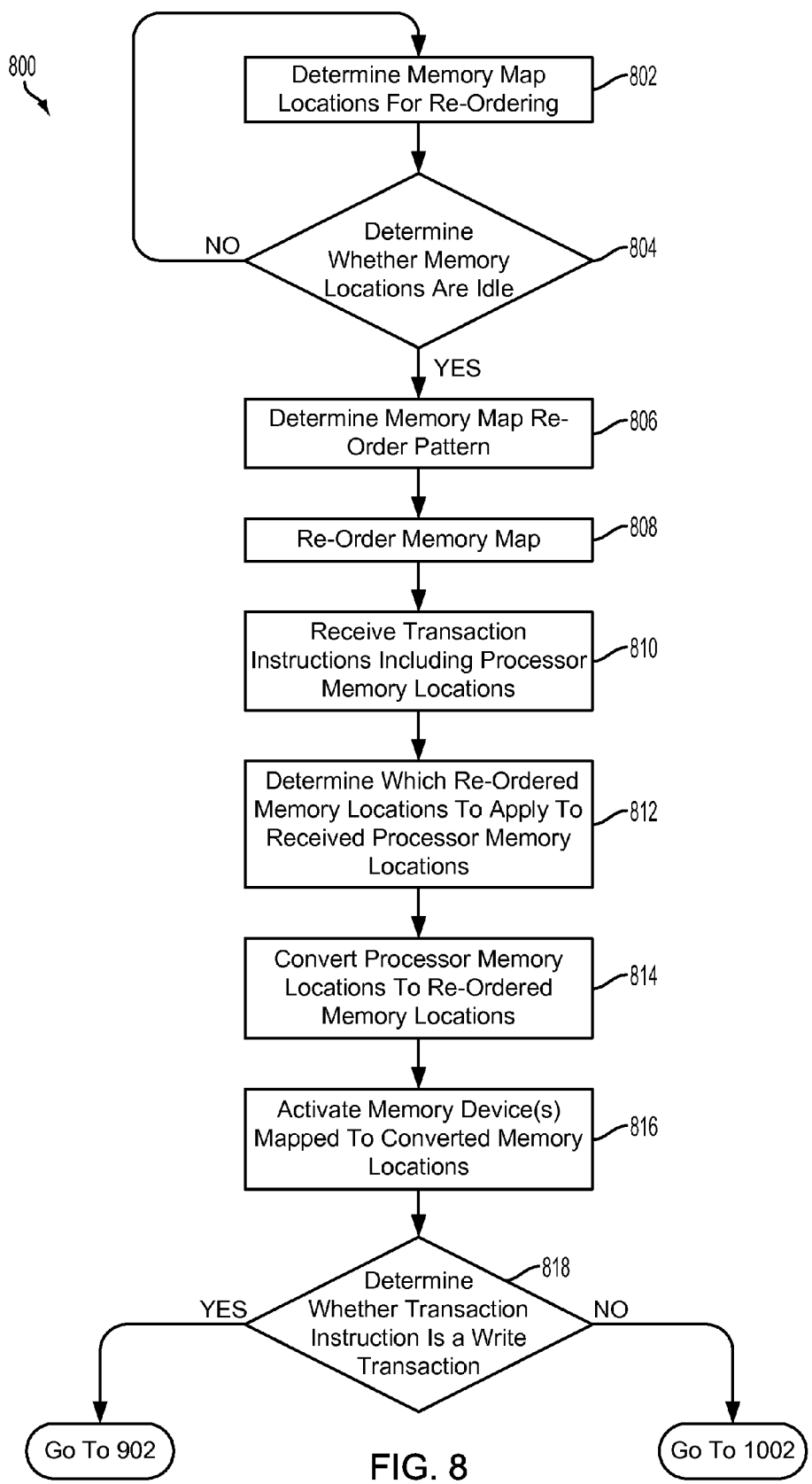
FIG. 8 is a process flow diagram illustrating an aspect method for memory map re-ordering for DRAM spatial coalescing within a single channel.

FIG. 8 illustrates an aspect method 800 for memory map re-ordering for DRAM spatial coalescing within a single channel. The method 800 may be implemented within a memory controller or similar components, or within various components of the computing device, including the processor, the memory controller including its components (e.g. reorder logic) as described herein, and the memory module including its components as described herein. For ease of reference, the operations within the method 800 are described as being performed by the memory controller in conjunction with the processor. References to the memory controller also encompass combinations of one or more of the memory controllers that may be connected to each of the individual memory devices, which may function individually or in combination to perform the aspect methods. It should be understood that references to the memory controller are intended to encompass any and all components involved in performing the aspect method.

In block 802, the memory controller in/or the processor may determine memory map locations for re-ordering. In making this determination the memory controller and/or the processor may use a number of factors. For example, the processor may be able to analyze a power, thermal, or activity state of the computing device, and compare the state to a threshold level. When the state of the computing device exhibits unfavorable power, thermal, or activity levels in relation to their respective thresholds, the processor may determine to implement a memory map of portions or all of one or more memory devices to reduce the power consumption and performance speed of the computing device. Depending on the amount of reduction in power consumption and performance speed that the processor may determine is desired, the processor and/or memory controller may select one or more a varying ranges of memory locations for re-ordering.

As another example of factors for determining memory locations for re-ordering, the processor may analyze software executing on the processor for its latency tolerance (i.e., the amount of latency in data write and or read operations that can be tolerated by the application). In a circumstance in which one or more software programs executed on the processor are determined to be latency tolerant (i.e., the software can tolerate delays in memory access transactions), the processor may determine to use re-order memory map locations that reduce power consumption at the expense of performance speed for the processes that do not need the current performance levels. In an aspect, the software applications may be configured to indicate to the processor whether the software is latency tolerant (e.g., in the form of flags, API calls, data tags, etc.), and that the processor may use such indications to configure the memory controller to re-order memory locations to reduce the power consumption at the expense of performance speed.

In an aspect, in response to the processor determining that the computing device is exhibiting favorable power, thermal, or activity levels that the software executing on the processor requires more performance speed, the processor may configure the memory controller to use the memory map of portions or all of one or more memory devices to increase the performance speed of the computing device at the expense of higher power consumption. Depending on the amount of increase in performance speed that the processor determines is desired, the processor in/or memory controller may select one or more a varying ranges of memory locations for re-ordering memory addresses.

To re-order the memory maps for the selected memory locations, the memory locations must be idle (i.e., not storing current data). If the memory locations are not idle, the computing device may lose track of data stored at those memory locations and may not be able to retrieve the data when requested, causing program errors in the executing software. In determination block 804, the memory controller and/or processor may determine whether the selected memory locations are idle. To make this determination, the memory controller and/or processor may check the memory device associated with the selected memory locations. When the memory device is energized, the memory controller and/or processor may determine that the memory locations are active. In an aspect, the memory controller and/or processor may also check a look up table that may indicate whether the memory locations are storing data or not. When the memory locations are determined to be storing data, the memory controller and/or processor may determine that the memory locations are active. When neither of these situations indicates that the memory locations are active, the memory controller and/or processor may determine that the memory locations are idle. In an aspect, when the memory locations are active, the memory controller and/or processor may intentionally and temporarily halt new transactions, and wait a predetermined period of time for prior transactions to complete to cause the memory locations to become idle. When the memory controller and/or processor determines that the memory locations are active (i.e. determination block 804="No"), the memory controller and/or processor may return to the operations in block 802.

When the memory controller and/or processor determines that the memory locations are idle (i.e. determination block 802="Yes"), the memory controller and/or processor may determine a memory map re-ordering pattern to be used for data transactions in block 806. The memory map re-ordering patterns may be chosen from the re-ordered memory map for minimum power consumption, the various re-ordered memory maps for latency tolerant processes, or the re-ordered memory map for maximum performance speed as described above. The memory controller and/or processor may chose the memory map re-ordering patterns to decrease power consumption or increase performance speed of the computing device.

In block 808, the memory controller may re-order the memory map according to the selected memory map re-order pattern. In re-ordering the memory map, the memory controller may save or have saved the original memory map of the memory devices to be able to return to the original memory map if desired. The memory controller may create a lookup table or some other known data structure through which it may assign memory addresses to the memory locations of the memory devices. The lookup table may also relate the re-ordered memory map to the original memory map. Through this relation of re-ordered and original memory maps, the memory controller may find the processor provided memory addresses in the original memory map and determine the related memory addresses of the re-ordered memory map. In an aspect, an algorithm may be associated with the varying memory map re-order patterns. The algorithm may be used to calculate a memory address from the processor provided memory address resulting in the corresponding re-ordered memory address.

In block 810, the memory controller may receive a transaction instruction from the processor including the processor-provided memory locations. As described above, the transaction type and the processor provided memory addresses may be routed to the appropriate components of the computing device. For a write transaction the data in parallel format may also be appropriately routed. In block 812, the memory controller may determine which re-ordered memory locations to apply to the processor provided memory locations. As described above, this determination may be accomplished by a comparison of the data in one or more data structures having the original memory addresses as expected by the processor and the corresponding re-ordered memory addresses of the re-ordered memory map. Also, in an aspect described above, the memory controller may apply an algorithm associated with the re-ordered memory map to determine the re-ordered memory address corresponding to the processor provided memory address.

In block 814, the memory controller may convert the processor provided memory address to the re-ordered memory address identified as the corresponding re-ordered memory address according to the implemented memory map re-order pattern. In block 816, the memory controller may activate, or energize, the individual memory device associated with the determined re-ordered memory address according to the re-ordered memory map. The data structures for the re-ordered memory map may not only identify the re-ordered memory addresses and their corresponding original memory addresses, but they may also identify the memory devices corresponding to the specific re-ordered and/or original memory addresses, or ranges of these memory addresses.

As described above, the aspect methods may be performed by each or combination of the memory controllers connected to each of the individual memory devices by dedicated device or chip select lines. These dedicated connections may create sub-channels within a typical channel to the memory module and all of its memory devices. The typical channel may allow for the activation and energizing of the memory module, together with all of its memory devices. The sub-channels may allow for individual activation or energizing of the individual memory devices of the memory module. The memory controller may apply power to the dedicated memory device or chip select line connected to one specific memory device to activate or energize just that one specific memory device. The memory controller may apply power to one or more memory device or chip select lines, each connected to one specific memory device, to active or energize one or more specific memory devices. The memory controller maintains control over each sub-channel to active or energize, or deactivate or de-energize, individual memory devices as desired or needed. By controlling the memory devices individually, the computing device may use less than all of the memory devices of the memory module, thereby using less energy than when all of the memory devices are active or energized.

In determination block, 818 the memory controller may determine whether the transaction instruction is for a write transaction. When the memory controller determines that the transaction instruction is a write transaction (i.e. determination block 818="Yes"), the memory controller may continue to implement the write transaction to the memory device in block 902 of FIG. 9 as described below. When the memory controller determines that the transaction instruction is not a write transaction (i.e. determination block 818="No"), the memory controller may continue to implement a read transaction from the memory device in block 1002 of FIG. 10 as described below. In an aspect, the memory controller may determine whether the transaction instruction is for a read transaction, and continue to blocks 902 or 1002 as appropriate.

FIG. 9 illustrates an aspect method 900 for converting data in parallel format to serial data to write to one or more of a plurality of memory devices. Similar to the method 800 described above, this method 900 may be implemented by a memory controller and/or a processor working in conjunction with the memory controller. When the processor of the computing device issues a data transaction instruction or request, the memory controller may determine whether the transaction instruction is indeed a write transaction instruction for writing to the memory of the computing device. When the memory controller determines that the transaction instruction is for a write transaction, as in determination block 818 described above with reference to FIG. 8, in block 902 the memory controller may signal the write transaction instruction to the memory device buffer connected to the memory device associated with the re-ordered memory addresses for the transaction. Signaling to the memory device buffer that the transaction is a write transaction may instruct the FIFO buffer of the memory device buffer to store the data in parallel provided by the processor as part of the write transaction. More than one memory device buffer may be signaled to received that data in parallel when the amount of data is too much for one memory device to manage.

As described above, the memory device buffer may be connected to a particular memory device through part of the memory data bus connecting the memory controller with the memory module. The data structure for the re-ordered memory map may also include the memory device buffer connected to the memory device associated with the original memory addresses and the re-ordered memory addresses.

In block 904, the memory controller may signal the memory device buffer connected to the activated memory device to convert the data in parallel format to serial data and to output the serial data to the memory device. As described above, the memory controller may signal the multiplexer of the memory device buffer associated with the re-ordered memory locations to selectively receive data from the FIFO buffer of the memory device buffer, and output the data to the memory device. The memory controller may signal the multiplexer to received data from the FIFO buffer at selected inputs of the multiplexer in a predetermined order. As the multiplexer receives the data at the selected inputs, it may also output the data to the memory device. Rather than receiving all of the data from the FIFO buffer in parallel and outputting all of the data at the same time, or in parallel, selectively receiving the data may allow the multiplexer to break up the data into predefined sized packets and output one packet at a time. The packets may each be as small as 1 bit. The reception of the data in the predetermined order and output of the data may convert the data received in parallel by the FIFO buffer to data serially output by the multiplexer. Thus, through select signals used to control the inputs to the multiplexer, the computing device may control the conversion of data in parallel format to serial data.

In block 906, the memory controller may signal to the memory module or the individual activated memory device to store the serial write data at the re-ordered memory addresses on the activated memory device. As described above, the memory controller may signal the transaction type, in this example a write transaction type, and the re-ordered memory addresses to the memory devices. The signal of the transaction type may control whether the memory device is supposed to store or release the serial data. In the case of a write transaction signal the memory device may store the serial data. The re-ordered memory addresses may specify to the memory device which memory locations of the memory device may be designated for storing specific portions of the serial data.

In determination block 908, the memory controller may determine whether the write transaction is complete. The write transaction may be complete when all the data of the transaction has been written to the re-ordered memory addresses on the memory devices. When the memory controller determines that the write transaction is complete (i.e. determination block 908="Yes"), the memory controller may end the method 900. When the memory controller determines that the write transaction is not complete (i.e. determination block 908="No"), the memory controller may continue converting the data in parallel format to serial data and writing the serial data to the re-ordered memory addresses in block 902. This may occur, for example, when the write transaction is for an amount of data greater than a single memory device buffer may handle. When multiple memory device buffers receive data in parallel for the write transaction, the memory controller may implement the method 900 for each memory device buffer, and in some cases for the same memory device buffer more than once if the amount of data of the write transaction is greater than all of the memory device buffers can manage.

In an aspect, when the memory map re-order pattern is for latency tolerant processes, the method 900 may be run for multiple memory device buffers in parallel.

FIG. 10 illustrates an aspect method 1000 that may be implemented in a memory controller for converting serial data to data in parallel format to read from one or more of a plurality of memory devices. When the processor of the computing device issues a transaction instruction or request, the memory controller may determine whether the transaction instruction is indeed a write (or read) transaction instruction for writing to (or reading from) the memory of the computing device. When the memory controller determines that the transaction instruction is not for a write transaction (or is for a read transaction), as in determination block 818 of FIG. 8 above, in block 1002 the memory controller may signal the read transaction instruction to the memory device buffer connected to the memory device associated with the re-ordered memory addresses for the transaction. Signaling to the memory device buffer that the transaction is a read transaction may instruct the FIFO buffer of the memory device buffer to store the serial data, provided by the memory device, in parallel as converted by the demultiplexer as part of the read transaction. When the data is stored on multiple memory devices, more than one memory device buffer may be signaled so that all of the serial data is received by the memory device buffers associated with the memory devices.

In block 1004, the memory controller may signal to the memory module or the individual activated memory device to release the serial read data from the re-ordered memory addresses on the activated memory device. As described above, the memory controller may signal the transaction type, in this example a read transaction type, and the re-ordered memory addresses to the memory devices. The signal of the transaction type may control whether the memory device is supposed to store or release the serial data. In the case of a read transaction signal the memory device may release the serial data. The re-ordered memory addresses may specify to the memory device which memory locations of the memory device may be designated as storing specific portions of the serial data.

In block 1006, the memory controller may signal the memory device buffer connected to the activated memory device to convert the serial data received from the memory device to data in parallel format and to output the data in parallel format to the processor. As described above, the memory controller may signal the FIFO buffer to store data received from the demultiplexer. The memory device connected to the demultiplexer of the memory device buffer associated with the re-ordered memory locations may be signaled by the computing device to release data from the re-ordered memory locations. The memory controller may also signal the demultiplexer to selectively output the data to the FIFO buffer of the memory device buffer in a predetermined sequence. The memory controller may signal the memory device to release the serial data to the demultiplexer, which may be received at the input of the demultiplexer.

As the demultiplexer receives the serial data at the input, it may also be signaled by the memory controller to selectively output the data to the FIFO buffer. Rather than serially outputting all of the data to the FIFO buffer, selectively outputting the data in the predetermined sequence may allow the demultiplexer to order the data in the FIFO buffer by outputting data to each input of the FIFO buffer one input at a time. The reception and output of the data may convert the serial data received by the demultiplexer to data in parallel format stored on the FIFO buffer. When a group of data is done being stored on the FIFO buffer, the memory controller may output the data from the FIFO buffer in parallel to the processor. Thus, through select signals used to control the outputs from the demultiplexer, the memory controller controls the conversion of serial data to data in parallel.

In determination block 1008, the memory controller may determine whether the read transaction is complete. The read transaction may be complete when all of the data requested for the transaction has been read from the re-ordered memory addresses on the memory devices. When the memory controller determines that the read transaction is complete (i.e. determination block 1008="Yes"), the memory controller may end the method 1000. When the memory controller determines that the read transaction is not complete (i.e. determination block 1008="No"), the memory controller may continue reading serial data from the reordered memory addresses and converting the serial data to data in parallel in block 1002. This may occur, for example, when the read transaction is for an amount of data greater than a single memory device buffer may handle. When multiple memory device buffers receive serial data for the read transaction, the memory controller may implement the method 1000 for each memory device buffer, and in some cases for the same memory device buffer more than once if the amount of data of the read transaction is greater than all of the memory device buffers can manage.

In an aspect, when the memory map re-order pattern is for latency tolerant processes, the method 1000 may be run for multiple memory device buffers in parallel.

FIG. 11 illustrates an aspect method 1100 that may be implemented in a memory controller or other components for converting data in parallel format to serial data to write to one or more of a plurality of memory devices. When the processor of the computing device issues a write transaction instruction or request, in block 1102 the data buffer of the memory controller may receive the write transaction signal from the re-order logic. As described above, the write transaction signal may signal to the data buffer, and more specifically to one or more FIFO buffers of the memory device buffers associated with the re-ordered memory addresses of the write transaction, to store the write data in parallel format provided by the processor.

In block 1104, the data buffer may receive the write transaction data in parallel format from the processor. As described above, the processor may be connected to the data buffer and the individual memory device buffers by the processor data bus. Each of the memory device buffers may be connected to the processor in parallel. As such, all of the data output in one burst by the processor is output to the processor data bus and effectively to all of the memory device buffers. However, only the memory device buffers that receive the write transaction signal are instructed to store the write data in parallel format from the processor. In an aspect, for each burst of write data in parallel format from the processor, up to a maximum size of the processor data bus, the re-order logic may signal only one of the memory device buffers to store the burst of write data in parallel format to its FIFO buffer.

In block 1106, the data buffer may receive the select signal from the re-order logic for serial input from the FIFO buffer to the multiplexer. In block 1108, the data buffer may convert the data in parallel format to serial data. As described above, the multiplexer of the data buffer may be connected to the FIFO buffer of the same data buffer. The outputs of the FIFO buffer may be connected to the inputs of the multiplexer. The multiplexer may receive the select signal via the multiplexer select bus. The select signals received by the multiplexer may indicate to the multiplexer which of its inputs to output. The select signals may instruct the multiplexer to output data it receives from the outputs of the FIFO buffer in an order. The order in which the select signal instruct the multiplexer to output the data it receives from the FIFO buffer may convert the data in parallel format as it is sent from the processor and stored on the FIFO buffer, to serial data output by the multiplexer.

In block 1110, the data buffer may output the serial data, converted by the multiplexer, to the memory device associated with the data buffer over the memory data bus. In determination block 1112, the memory controller may determine whether the write transaction is complete. The write transaction may conclude for the purposes of determination block 1112 when all of the data associate with the write transaction signal is output as serial data to the memory device in block 1110. In an aspect a transaction may include multiple data bursts and more write data may be received by the data buffer for one or more of the memory device buffers. When the memory controller determines that the write transaction is complete (i.e. determination block 1112="Yes"), the memory controller may end the method 1100. When the memory controller determines that the write transactions is not complete (i.e. determination block 1112="No"), the memory controller may continue to receive the remaining write data in block 1104.

FIG. 12 illustrates an aspect method 1200 for converting serial data to data in parallel format to read from one or more of a plurality of memory devices. The computing device, including the processor, the memory controller including its components as described herein, and the memory module including its components as described herein, may implement this method 1200. When the processor of the computing device issues a read transaction instruction or request, in block 1202 the data buffer of the memory controller may receive the read transaction signal from the re-order logic. As described above, the read transaction signal may signal to the data buffer, and more specifically to one or more FIFO buffers of the memory device buffers associated with the re-ordered memory addresses of the read transaction, to store the read data in parallel format provided by the memory device as serial data and converted to data in parallel format by the demultiplexer.

In block 1204, the data buffer may receive the serial read transaction data from the memory device. As described above, the memory device may be connected to the data buffer and the individual memory device buffers by the memory data bus. Each of the memory device buffers may be connected to the associated one or more memory devices. As such, all of the serial data output by the memory device is output to the memory data bus and directly to the associated memory device buffers. In an aspect, the memory devices may be connect to multiple memory device buffers in parallel. The re-order logic may control which of the memory device buffers receive the read transaction signal and demultiplexer select signals instructing the memory device buffers to store the serial read data from the memory devices in parallel. In an aspect, for each burst of serial read data from the memory device, up to a maximum size of the processor data bus, the re-order logic may signal only one of the memory device buffers to store the burst of serial read data in parallel format to its FIFO buffer.

In block 1206, the data buffer may receive the select signal from the re-order logic for output in parallel from the demultiplexer to the FIFO buffer. In block 1208, the data buffer may convert the serial data to data in parallel. As described above, the demultiplexer of the data buffer may be connected to the FIFO buffer of the same data buffer. The outputs of the demultiplexer may be connected to the inputs of the FIFO buffer. The demultiplexer may receive the select signal via the demultiplexer select bus. The select signals received by the demultiplexer indicate to the demultiplexer on which output to output the received input from the memory device. The select signals may instruct the demultiplexer to output data it receives to the inputs of the FIFO buffer in an order. The order in which the select signal instruct the multiplexer to output the data it receives from the memory device may convert the serial data as it is sent from the memory device, to data in parallel format saved by the FIFO buffer and output to the processor.

In block 1210, the data buffer may output the read data in parallel, converted by the demultiplexer, to the processor over the processor data bus. In determination block 1212, the memory controller may determine whether the read transaction is complete. The read transaction may conclude for the purposes of determination block 1212 when all of the data associate with the read transaction signal is output as data in parallel format to the processor in block 1210. In an aspect a transaction may include multiple data burst and more read data may be received by the data buffer for one or more of the memory device buffers. When the memory controller determines that the read transaction is complete (i.e. determination block 1212="Yes"), the memory controller may end the method 1200. When the memory controller determines that the read transactions is not complete (i.e. determination block 1212="No"), the memory controller may continue to receive the remaining read data in block 1204.

Figure 13:
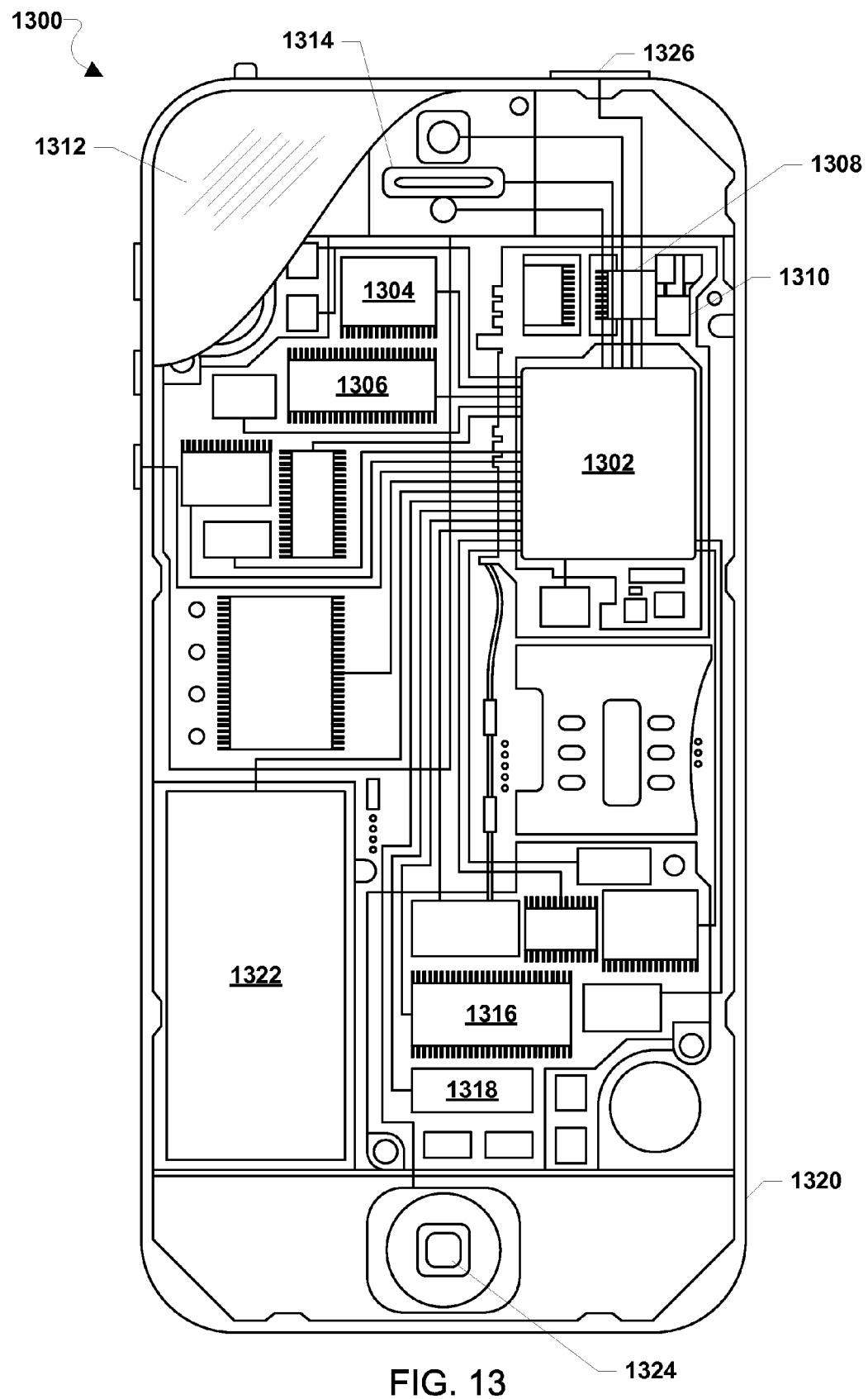
FIG. 13 is component block diagram illustrating an example mobile device suitable for use with the various aspects.

FIG. 13 illustrates an example mobile device suitable for use with the various aspects. The mobile device 1300 may include a processor 1302 coupled to a touchscreen controller 1304 and an internal memory 1306. The processor 1302 may be one or more multicore integrated circuits designated for general or specific processing tasks. The internal memory 1306 may be volatile or non-volatile memory, and may also be secure and/or encrypted memory, or unsecure and/or unencrypted memory, or any combination thereof. Examples of memory types which can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1304 and the processor 1302 may also be coupled to a touchscreen panel 1312, such as a resistive-sensing touchscreen, capacitive-sensing touchscreen, infrared sensing touchscreen, etc. Additionally, the display of the computing device 1300 need not have touch screen capability.

The mobile device 1300 may have one or more radio signal transceivers 1308 (e.g., Peanut, Bluetooth, Zigbee, Wi-Fi, RF radio) and antennae 1310, for sending and receiving communications, coupled to each other and/or to the processor 1302. The transceivers 1308 and antennae 1310 may be used with the above-mentioned circuitry to implement the various wireless transmission protocol stacks and interfaces. The mobile device 1300 may include a cellular network wireless modem chip 1316 that enables communication via a cellular network and is coupled to the processor.

The mobile device 1300 may include a peripheral device connection interface 1318 coupled to the processor 1302. The peripheral device connection interface 1318 may be singularly configured to accept one type of connection, or may be configured to accept various types of physical and communication connections, common or proprietary, such as USB, FireWire, Thunderbolt, or PCIe. The peripheral device connection interface 1318 may also be coupled to a similarly configured peripheral device connection port (not shown).

The mobile device 1300 may also include speakers 1314 for providing audio outputs. The mobile device 1300 may also include a housing 1320, constructed of a plastic, metal, or a combination of materials, for containing all or some of the components discussed herein. The mobile device 1300 may include a power source 1322 coupled to the processor 1302, such as a disposable or rechargeable battery. The rechargeable battery may also be coupled to the peripheral device connection port to receive a charging current from a source external to the mobile device 1300. The mobile device 1300 may also include a physical button 1324 for receiving user inputs. The mobile device 1300 may also include a power button 1326 for turning the mobile device 1300 on and off.

Figure 14:
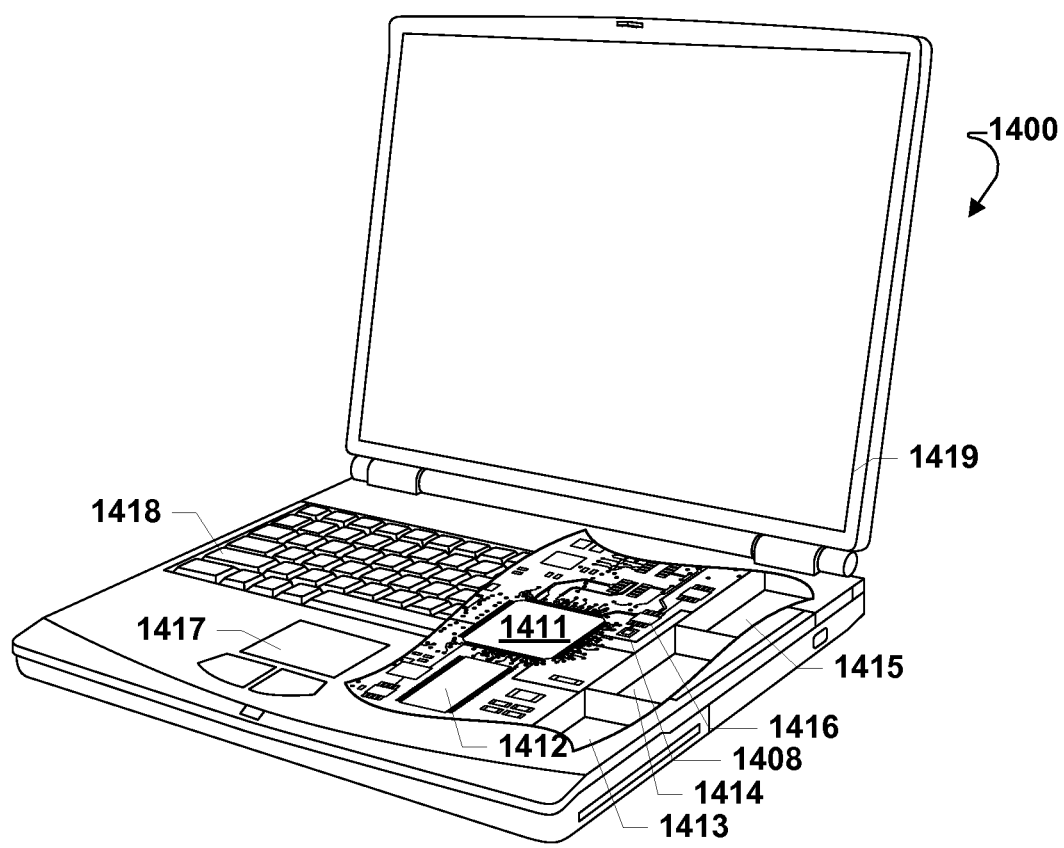
FIG. 14 is component block diagram illustrating an example mobile device suitable for use with the various aspects.

The various aspects described above may also be implemented within a variety of mobile devices, such as a laptop computer 1400 illustrated in FIG. 14. Many laptop computers include a touchpad touch surface 1417 that serves as the computer's pointing device, and thus may receive drag, scroll, and flick gestures similar to those implemented on computing devices equipped with a touch screen display and described above. A laptop computer 1400 will typically include a processor 1411 coupled to volatile memory 1412 and a large capacity nonvolatile memory, such as a disk drive 1413 of Flash memory. Additionally, the computer 1400 may have one or more antenna 1408 for sending and receiving electromagnetic radiation that may be connected to a wireless data link and/or cellular telephone transceiver 1416 coupled to the processor 1411. The computer 1400 may also include a floppy disc drive 1414 and a compact disc (CD) drive 1415 coupled to the processor 1411. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be use in conjunction with the various aspects.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for using a plurality of memory devices of a memory module, comprising:
    re-ordering a memory map of the plurality of memory devices resulting in a re-ordered memory map such that a data burst for a memory transaction instruction uses less than all of the plurality of memory devices;
    receiving at least one memory address associated with the memory transaction instruction;
    converting the at least one memory address to at least one re-ordered memory address according to the re-ordered memory map; and
    activating less than all of the plurality of memory devices to execute the memory transaction instruction for the data burst by activating each of the less than all of the plurality of memory devices individually, wherein the activated less than all of the plurality of memory devices are associated with the at least one re-ordered memory address according to the re-ordered memory map.

2. The method of claim 1, wherein:
    re-ordering the memory map of the plurality of memory devices resulting in the re-ordered memory map such that the data burst for the memory transaction instruction uses less than all of the plurality of memory devices comprises re-ordering the memory map of the plurality of memory devices resulting in the re-ordered memory map such that the data burst for the memory transaction instruction uses one of the plurality of memory devices, and
    activating less than all of the plurality of memory devices to execute the memory transaction instruction for the data burst comprises activating one of the plurality of memory devices to execute the memory transaction instruction for the data burst.

3. The method of claim 1, wherein re-ordering the memory map of the plurality of memory devices resulting in the re-ordered memory map such that the data burst for the memory transaction instruction uses less than all of the plurality of memory devices comprises re-ordering the memory map of the plurality of memory devices resulting in the re-ordered memory map such that the data burst for the memory transaction instruction uses at least one of the plurality of memory devices of the memory module multiple times.

4. The method of claim 1, further comprising:
    receiving the memory transaction instruction for a write transaction including the data burst and the at least one memory address for writing to the plurality of memory devices, wherein the data burst comprises write data in parallel;
    converting at least a portion of the data burst to serial write data for writing to the re-ordered memory address; and
    outputting the converted write data to at least one of the activated less than all of the plurality of memory devices associated with the re-ordered memory address.

5. The method of claim 1, further comprising:
    receiving the memory transaction instruction for a read transaction including the at least one memory address for reading from the plurality of memory devices;

receiving the data burst from at least one of the activated less than all of the plurality of memory devices associated with the re-ordered memory address, wherein at least a portion of the data burst comprises serial read data;

converting the data burst to read data in parallel format such that the read data in parallel format is ordered to conform with memory addresses of the memory transaction instruction; and outputting the read data in parallel format to a processor.

6. The method of claim 1, wherein re-ordering the memory map of the plurality of memory devices resulting in the re-ordered memory map such that the data burst for the memory transaction instruction uses less than all of the plurality of memory devices comprises re-ordering portions of the memory map of the plurality of memory devices using different re-order patterns in which at least one portion of the memory map is re-ordered such that the data burst for the memory transaction instruction uses less than all of the plurality of memory devices.

7. An apparatus, comprising:
a memory controller for using a plurality of memory devices of a memory module, wherein the memory controller is configured to perform operation comprising:
re-ordering a memory map of the plurality of memory devices resulting in a re-ordered memory map such that a data burst for a memory transaction instruction uses less than all of the plurality of memory devices;
receiving at least one memory address associated with the memory transaction instruction;
converting the at least one memory address to at least one re-ordered memory address according to the re-ordered memory map; and
activating less than all of the plurality of memory devices to execute the memory transaction instruction for the data burst by activating each of the less than all of the plurality of memory devices individually, wherein the activated less than all of the plurality of memory devices are associated with the at least one re-ordered memory address according to the re-ordered memory map.

8. The apparatus of claim 7, wherein the memory controller is configured to perform operations such that:
re-ordering the memory map of the plurality of memory devices resulting in the re-ordered memory map such that the data burst for the memory transaction instruction uses less than all of the plurality of memory devices comprises re-ordering the memory map of the plurality of memory devices resulting in the re-ordered memory map such that the data burst for the memory transaction instruction uses one of the plurality of memory devices, and
activating less than all of the plurality of memory devices to execute the memory transaction instruction for the data burst comprises activating one of the plurality of memory devices to execute the memory transaction instruction for the data burst.

9. The apparatus of claim 7, wherein the memory controller is configured to perform operations such that re-ordering the memory map of the plurality of memory devices resulting in the re-ordered memory map such that the data burst for the memory transaction instruction uses less than all of the plurality of memory devices comprises re-ordering the memory map of the plurality of memory devices resulting in the re-ordered memory map such that the data burst for the memory transaction instruction uses at least one of the plurality of memory devices of the memory module multiple times.

10. The apparatus of claim 7, wherein the memory controller is further configured to perform operations comprising:
receiving the memory transaction instruction for a write transaction including the data burst and the at least one memory address for writing to the plurality of memory devices, wherein the data burst comprises write data in parallel;
converting at least a portion of the data burst to serial write data for writing to the re-ordered memory address; and
outputting the converted write data to at least one of the activated less than all of the plurality of memory devices associated with the re-ordered memory address.

11. The apparatus of claim 7, wherein the memory controller is further configured to perform operations comprising:
receiving the memory transaction instruction for a read transaction including the at least one memory address for reading from the plurality of memory devices;
receiving the data burst from at least one of the activated less than all of the plurality of memory devices associated with the re-ordered memory address, wherein at least a portion of the data burst comprises serial read data;
converting the data burst to read data in parallel format such that the read data in parallel format is ordered to conform with memory addresses of the memory transaction instruction; and
outputting the read data in parallel format to a processor.

12. The apparatus of claim 7, wherein the memory controller is configured to perform operations such that re-ordering the memory map of the plurality of memory devices resulting in the re-ordered memory map such that the data burst for the memory transaction instruction uses less than all of the plurality of memory devices comprises re-ordering portions of the memory map of the plurality of memory devices using different re-order patterns in which at least one portion of the memory map is re-ordered such that the data burst for the memory transaction instruction uses less than all of the plurality of memory devices.

13. An apparatus for using a plurality of memory devices of a memory module, comprising:
means for re-ordering a memory map of the plurality of memory devices resulting in a re-ordered memory map such that a data burst for a memory transaction instruction uses less than all of the plurality of memory devices;
means for receiving at least one memory address associated with the memory transaction instruction;
means for converting the at least one memory address to at least one re-ordered memory address according to the re-ordered memory map; and
means for activating less than all of the plurality of memory devices to execute the memory transaction instruction for the data burst comprises means for activating each of the less than all of the plurality of memory devices individually, wherein the activated less than all of the plurality of memory devices are associated with the at least one re-ordered memory address according to the re-ordered memory map.

14. The apparatus of claim 13, wherein:
means for re-ordering the memory map of the plurality of memory devices resulting in the re-ordered memory map such that the data burst for the memory transaction instruction uses less than all of the plurality of memory devices comprises means for re-ordering the memory map of the plurality of memory devices resulting in the re-ordered memory map such that the data burst for the memory transaction instruction uses one of the plurality of memory devices, and means for activating less than all of the plurality of memory devices to execute the memory transaction instruction for the data burst comprises means for activating one of the plurality of memory devices to execute the memory transaction instruction for the data burst.

15. The apparatus of claim 13, wherein means for re-ordering the memory map of the plurality of memory devices resulting in the re-ordered memory map such that the data burst for the memory transaction instruction uses less than all of the plurality of memory devices comprises means for re-ordering the memory map of the plurality of memory devices resulting in the re-ordered memory map such that the data burst for the memory transaction instruction uses at least one of the plurality of memory devices of the memory module multiple times.

16. The apparatus of claim 13, further comprising:
means for receiving the memory transaction instruction for a write transaction including the data burst and the at least one memory address for writing to the plurality of memory devices, wherein the data burst comprises write data in parallel;
means for converting at least a portion of the data burst to serial write data for writing to the re-ordered memory address; and
means for outputting the converted write data to at least one of the activated less than all of the plurality of memory devices associated with the re-ordered memory address.

17. The apparatus of claim 13, further comprising:
means for receiving the memory transaction instruction for a read transaction including the at least one memory address for reading from the plurality of memory devices;
means for receiving the data burst from at least one of the activated less than all of the plurality of memory devices associated with the re-ordered memory address, wherein at least a portion of the data burst comprises serial read data;
means for converting the data burst to read data in parallel format such that the read data in parallel format is ordered to conform with memory addresses of the memory transaction instruction; and
means for outputting the read data in parallel format to a processor.

18. The apparatus of claim 13, wherein means for re-ordering the memory map of the plurality of memory devices resulting in the re-ordered memory map such that the data burst for the memory transaction instruction uses less than all of the plurality of memory devices comprises means for re-ordering portions of the memory map of the plurality of memory devices using different re-order patterns in which at least one portion of the memory map is re-ordered such that the data burst for the memory transaction instruction uses less than all of the plurality of memory devices.

19. A non-transitory processor-readable medium having stored thereon processor-executable instructions configured to cause a memory controller to perform operations comprising:
re-ordering a memory map of a plurality of memory devices of a memory module resulting in a re-ordered memory map such that a data burst for a memory transaction instruction uses less than all of the plurality of memory devices;
receiving at least one memory address associated with the memory transaction instruction;
converting the at least one memory address to at least one re-ordered memory address according to the re-ordered memory map; and
activating less than all of the plurality of memory devices to execute the memory transaction instruction for the data burst by activating each of the less than all of the plurality of memory devices individually, wherein the activated less than all of the plurality of memory devices are associated with the at least one re-ordered memory address according to the re-ordered memory map.

20. The non-transitory processor-readable medium of claim 19, wherein the stored processor-executable instructions are configured to cause the memory controller to perform operations such that:
re-ordering the memory map of the plurality of memory devices resulting in the re-ordered memory map such that the data burst for the memory transaction instruction uses less than all of the plurality of memory devices comprises re-ordering the memory map of the plurality of memory devices resulting in the re-ordered memory map such that the data burst for the memory transaction instruction uses one of the plurality of memory devices, and
activating less than all of the plurality of memory devices to execute the memory transaction instruction for the data burst comprises activating one of the plurality of memory devices to execute the memory transaction instruction for the data burst.

21. The non-transitory processor-readable medium of claim 19, wherein the stored processor-executable instructions are configured to cause the memory controller to perform operations such that re-ordering the memory map of the plurality of memory devices resulting in the re-ordered memory map such that the data burst for the memory transaction instruction uses less than all of the plurality of memory devices comprises re-ordering the memory map of the plurality of memory devices resulting in the re-ordered memory map such that the data burst for the memory transaction instruction uses at least one of the plurality of memory devices of the memory module multiple times.

22. The non-transitory processor-readable medium of claim 19, wherein the stored processor-executable instructions are configured to cause the memory controller to perform operations further comprising:
receiving the memory transaction instruction for a write transaction including the data burst and the at least one memory address for writing to the plurality of memory devices, wherein the data burst comprises write data in parallel;
converting at least a portion of the data burst to serial write data for writing to the re-ordered memory address; and
outputting the converted write data to at least one of the activated less than all of the plurality of memory devices associated with the re-ordered memory address.

23. The non-transitory processor-readable medium of claim 19, wherein the stored processor-executable instructions are configured to cause the memory controller to perform operations further comprising:
receiving the memory transaction instruction for a read transaction including the at least one memory address for reading from the plurality of memory devices;
receiving the data burst from at least one of the activated less than all of the plurality of memory devices associated with the re-ordered memory address, wherein at least a portion of the data burst comprises serial read data;
converting the data burst to read data in parallel format such that the read data in parallel format is ordered to conform with memory addresses of the memory transaction instruction; and outputting the read data in parallel format to a processor.

24. The non-transitory processor-readable medium of claim 19, wherein the stored processor-executable instructions are configured to cause the memory controller to perform operations such that re-ordering the memory map of the plurality of memory devices resulting in the re-ordered memory map such that the data burst for the memory transaction instruction uses less than all of the plurality of memory devices comprises re-ordering portions of the memory map of the plurality of memory devices using different re-order patterns in which at least one portion of the memory map is re-ordered such that the data burst for the memory transaction instruction uses less than all of the plurality of memory devices.

* * * * *